Figure 6:
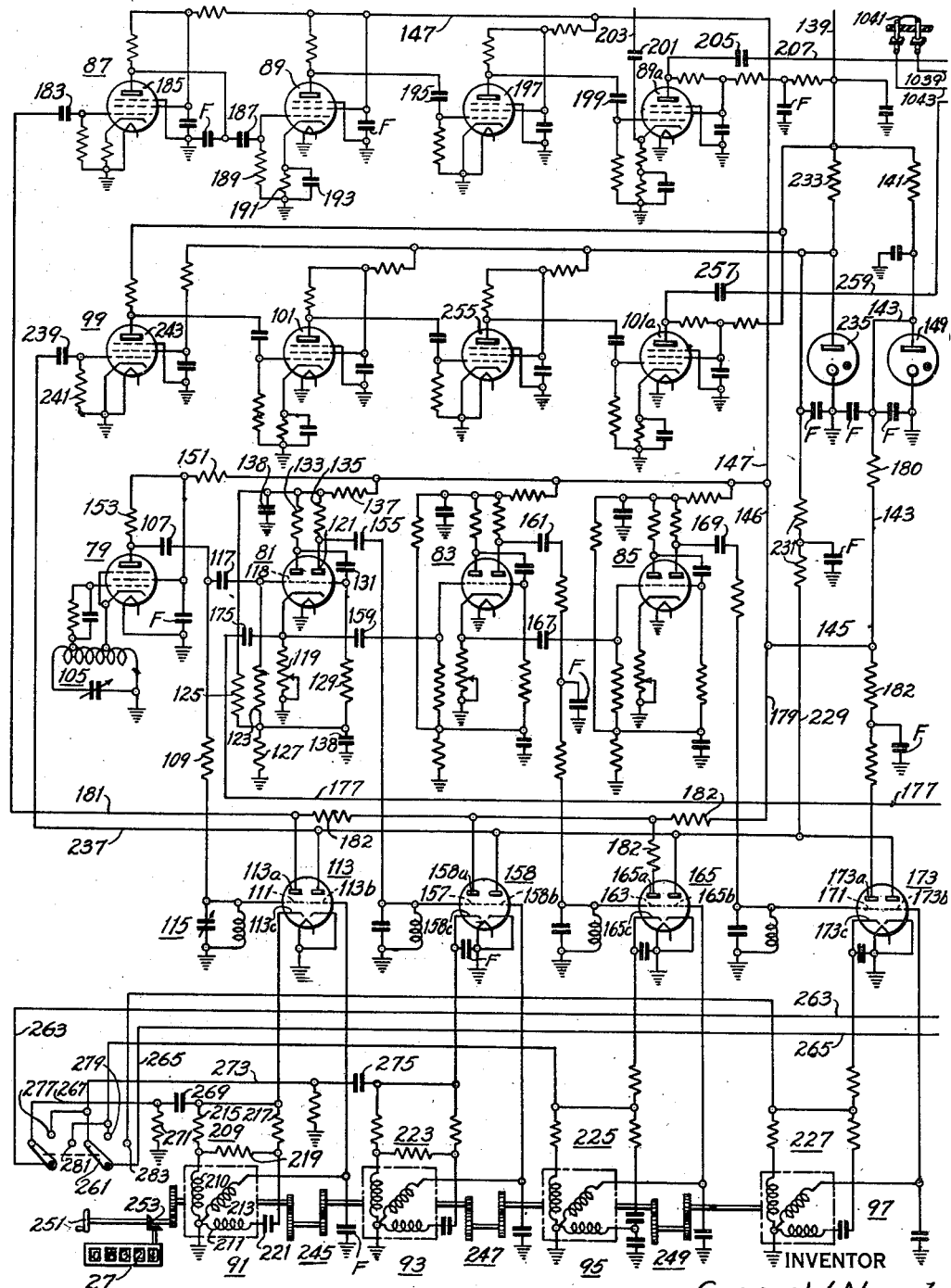

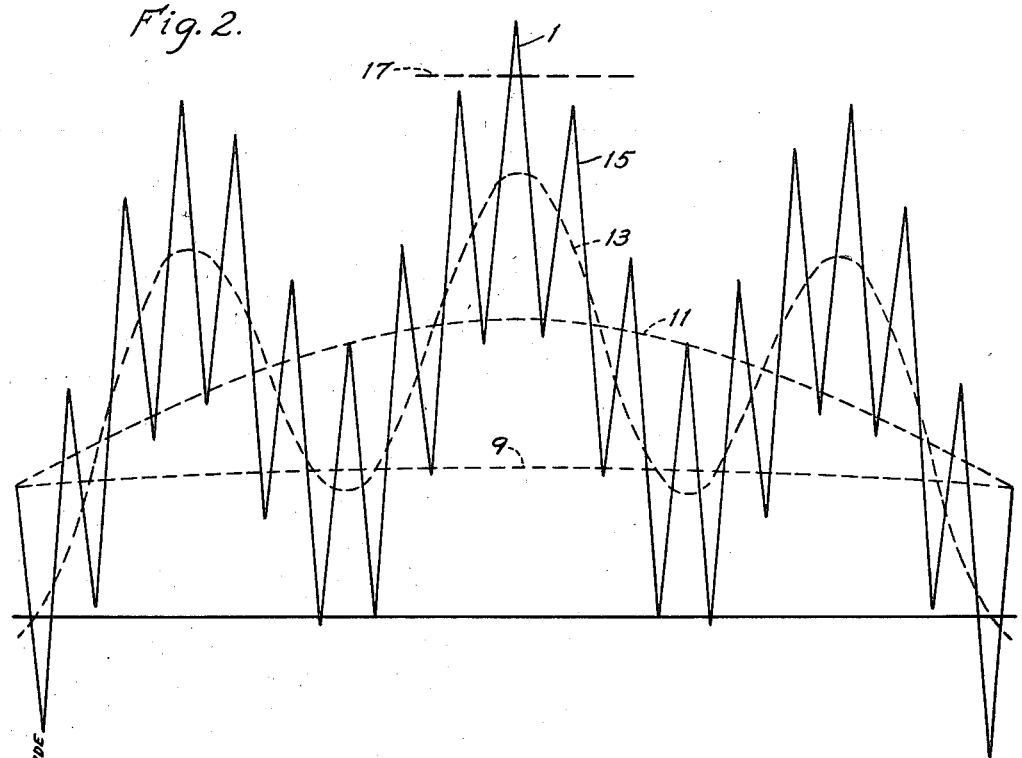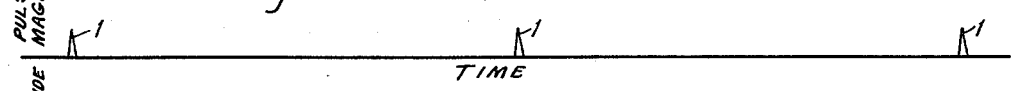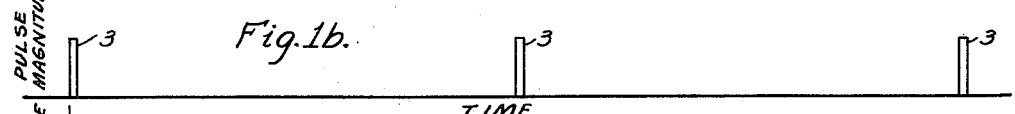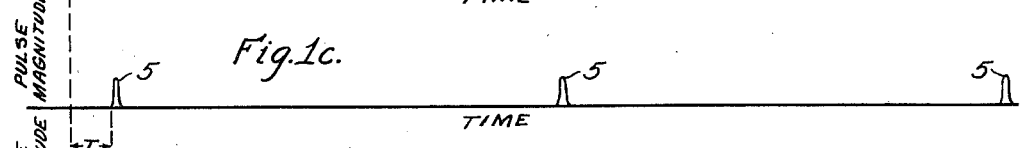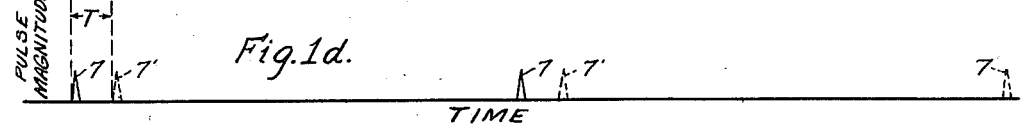

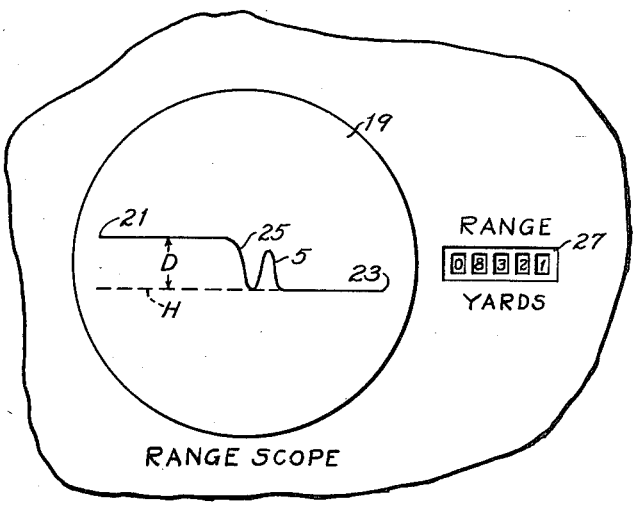
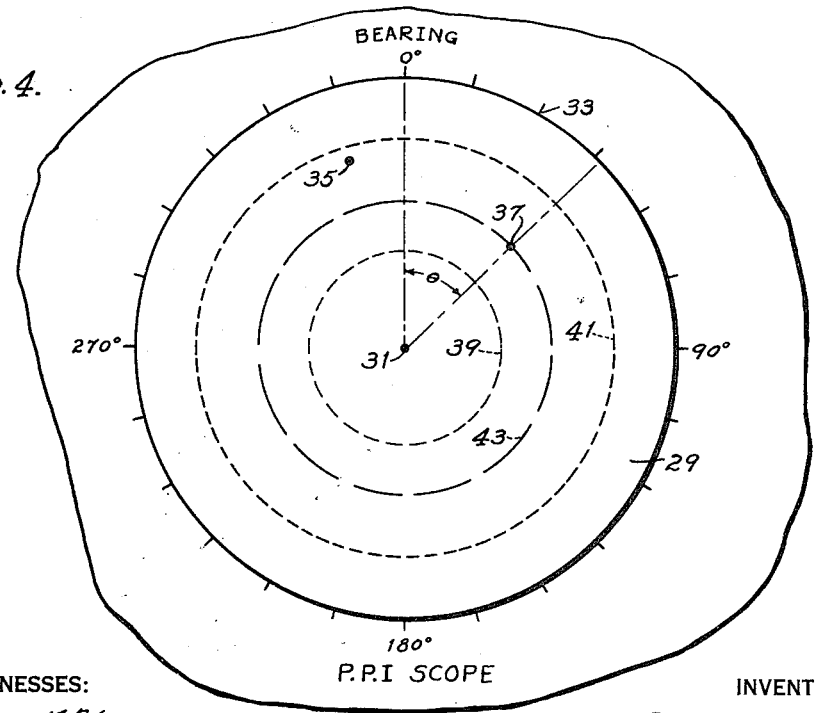

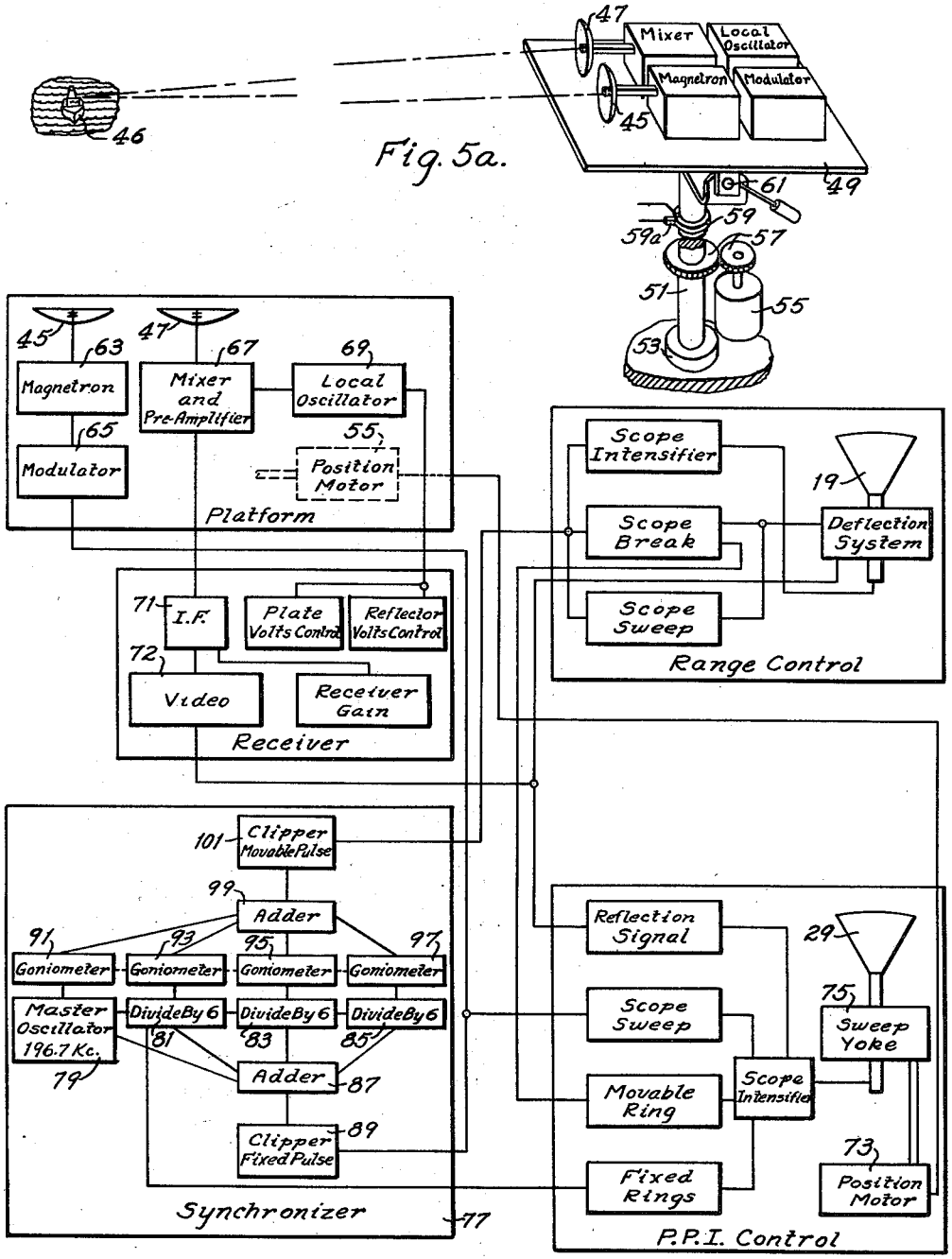

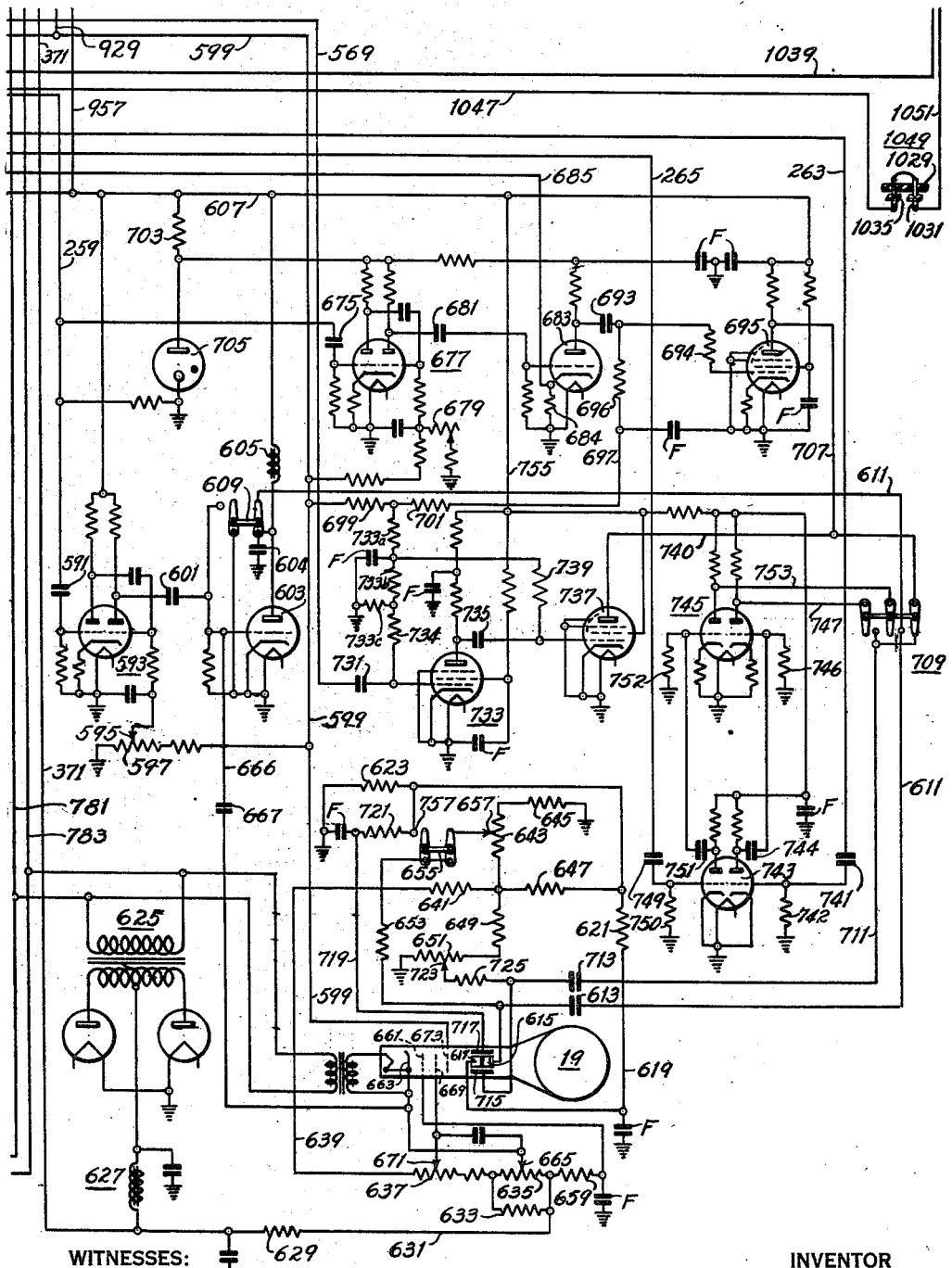

2,857,591

RADIO LOCATORS

George W. Nagel, Baltimore, Md., assignor to Westinghouse Electric Corporation, East Pittsburgh, Pa., a corporation of Pennsylvania Application September 4, 1943; Serial No. 501,297

39 Claims. (Cl. 343—13)

This invention relates to devices for producing quantities in the form of accurately timed pulses, and it has particular relation to equipment employing such pulses for determining the location of a body with respect to an observation or reference station.

For many years attempts have been made to locate with accuracy a body with respect to a reference station. As examples of applications wherein such information is desirable, reference may be made to ships. Locating devices may be employed on board ship for the purpose of locating a shore line which the ship is approaching or a buoy employed for marking a ship channel. In addition, such devices are suitable for locating other ships for the purpose of avoiding collisions. Such information is particularly desirable in foggy weather or at night.

In war time, locating devices assist in determining the presence and location of enemy ships. The information obtained from a locating device may be employed, for example, to control the fire of guns on a warship. In addition, the locator devices may be located on land adjacent a shore line for the purpose of detecting and locating approaching ships. Although ships have been mentioned specifically, the same comments apply to other vehicles and bodies such as aircraft and land vehicles. For example, altimeters are desirable on an aircraft for measuring the height of an aircraft above the terrain.

The value of information obtained from a locating device is dependent to a large extent on the accuracy of such information. In general, the desired information includes the direction of a body with respect to the observation or reference station and the range or distance of the body with respect to the observation or reference station. If the body to be located has three degrees of freedom with respect to the reference station, the direction to be ascertained may include both azimuth and elevation components. Such components may be employed for locating aircraft with reference to a land reference station. On the other hand, if the body to be located possesses only two degrees of freedom with respect to the reference station, a single direction component, such as azimuth, may suffice. For example, in determining the direction of a ship with respect to another ship or with respect to a land station, a determination of azimuth suffices generally.

In addition to direction, it is desirable to know the range or distance of a body to be located with respect to the observation or reference station. In the case of ships, such information is desirable to indicate permissible maneuvers and for controlling gun fire. For certain work, such as fire control, extreme accuracy is desirable. For example, in locating a body 25,000 yards distance from an observation or reference station, the permissible error preferably should be not more than 50 yards.

For many years, efforts have been made to develop accurate locating devices. The difficulties to be overcome in such development have been both mechanical and electrical in nature. The prior art methods have employed repetitive quantities such as electrical pulses for timing purposes. Consequently, the accuracy of such devices is dependent on the mechanical and electrical accuracies with which the pulses are formed.

In accordance with the invention, repetitive quantities such as electrical pulses are controlled accurately with respect to timing by electrical and mechanical vernier mechanisms. To this end, a plurality of repetitive quantities such as alternating voltage having different frequencies are produced. The frequencies and relationships of the voltage are so selected that crests or peaks of the voltages are in alignment at each of a plurality of the crests or peaks of the voltage having the lowest frequency of alternation. By addition of the voltages a first resultant peak is obtained which has a frequency of repetition determined by the voltage having the lowest frequency of alternation.

A second repetitive resultant peak is obtained by passing each of the alternating voltages through a phase shifter. The phase shifters are adjustable to shift the phase relationship of each of the voltages at rates such that the phase relationships between the phase-shifted voltages are undisturbed. The outputs of the phase shifters are combined to provide second resultant peaks similar in frequency of repetition to the first resultant peaks but adjustable in phase with respect thereto.

The first resultant peaks are employed for controlling the emission of repetitive pulses which are radiated from an observation or reference station to an object to be located with reference to the observation station. When these pulses strike the object, they produce reflections or echoes which are detected by a receiver located at the observation station. The time required for the pulse to travel to the object and for the echo to travel from the object to the observation station is a measure of the range or distance between the object and the observation station.

For determining accurately the desired range, the phase-shifted second resultant peaks are compared to the echoes or reflections detected by the receiver. The phase shifters are operated to establish a predetermined relationship between the second resultant peaks and the aforesaid echoes or reflections. The adjustment of the phase shifters required for this purpose is a measure of the desired range.

If the pulses are emitted in a highly directional path, the locating devices embodying the invention also may be employed for determining the direction of a body with respect to the observation station. In such a case, echoes or reflections are produced only when the highly directional pulses strike the object. Consequently, when echoes or reflections are detected at the observation station, the direction of emission of the pulse is indicative of the direction of the body with respect to the observation station.

It is, therefore, an object of the invention to provide a system for producing repetitive quantities having accurately controlled timing.

It is a further object of the invention to combine a plurality of alternating quantities having different frequencies of alternation for the purpose of producing a resultant quantity having a sharpness characteristic of one of the alternating quantities and having a frequency of repetition characteristics of one of the alternating quantities.

It is an additional object of the invention to derive from a first alternating quantity a plurality of additional alternating quantities each having a unique frequency of alternation and selecting the frequencies and phase relationships of the quantities to bring the peaks or crests of the alternating quantities into alignment at each of a plurality of peaks or crests of the quantity having the lowest frequency of alternation.

It is a still further object of the invention to provide means for producing a first repetitive quantity, means for obtaining a second repetitive quantity having a relationship to the first repetitive quantity dependent on an unknown to be ascertained, together with means for producing a third repetitive quantity bearing a relationship to the first repetitive quantity which may be varied in an accurately known manner and means for establishing a predetermined relationship between the second and third repetitive quantities.

It is also an object of the invention to provide means for producing a plurality of alternating quantities each having a unique frequency of alternation, a transmitter controlled by a first resultant of the alternating quantities for transmitting repetitive pulses in a directional path, a detector for reflections or echoes set up by the repetitive pulses and means for adjusting in a known manner the phase of a second resultant of the alternating quantities relative to the first resultant to establish a predetermined relationship between the phase shifted resultant and the detected reflections or echoes.

Figure 7:
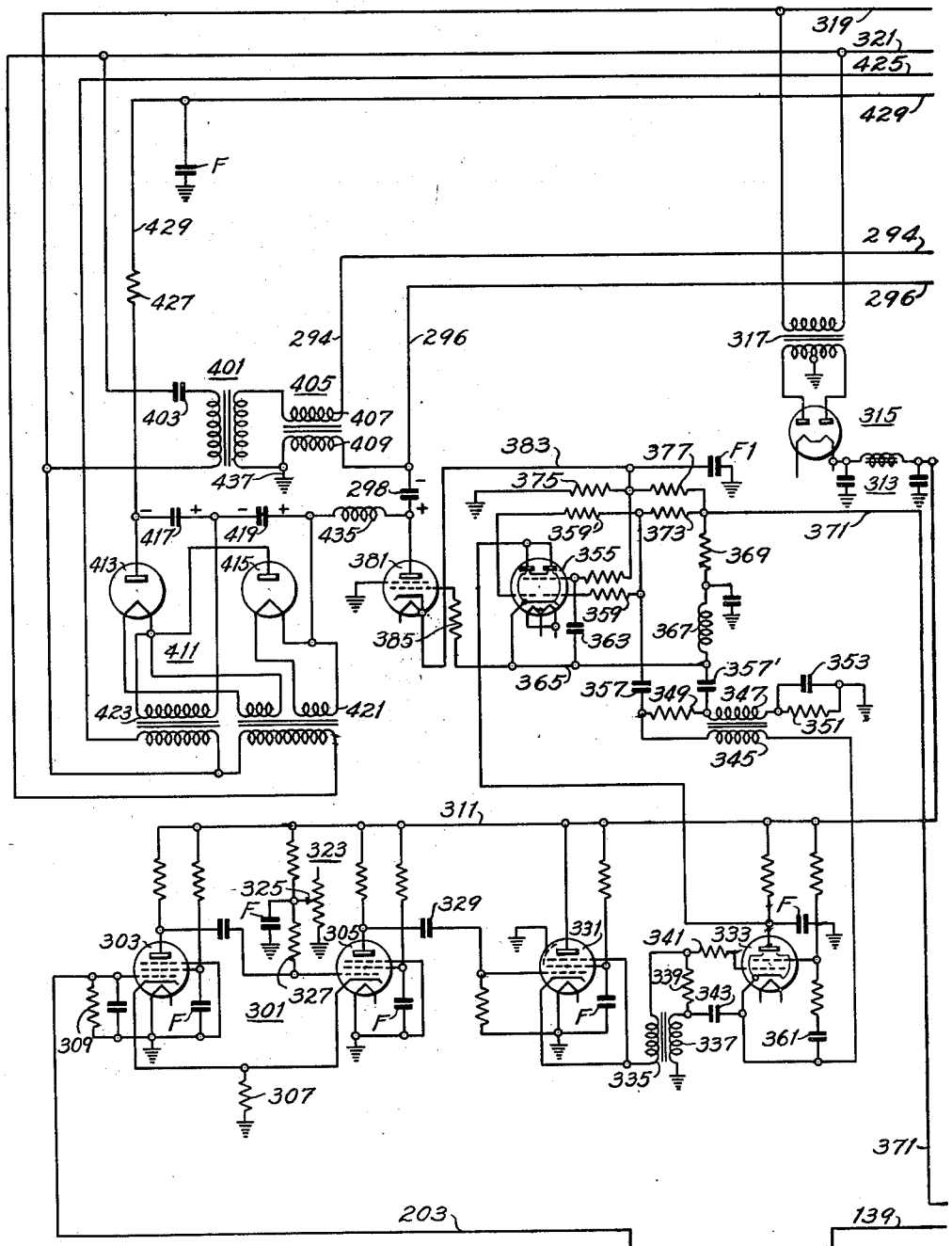
Figure 8:
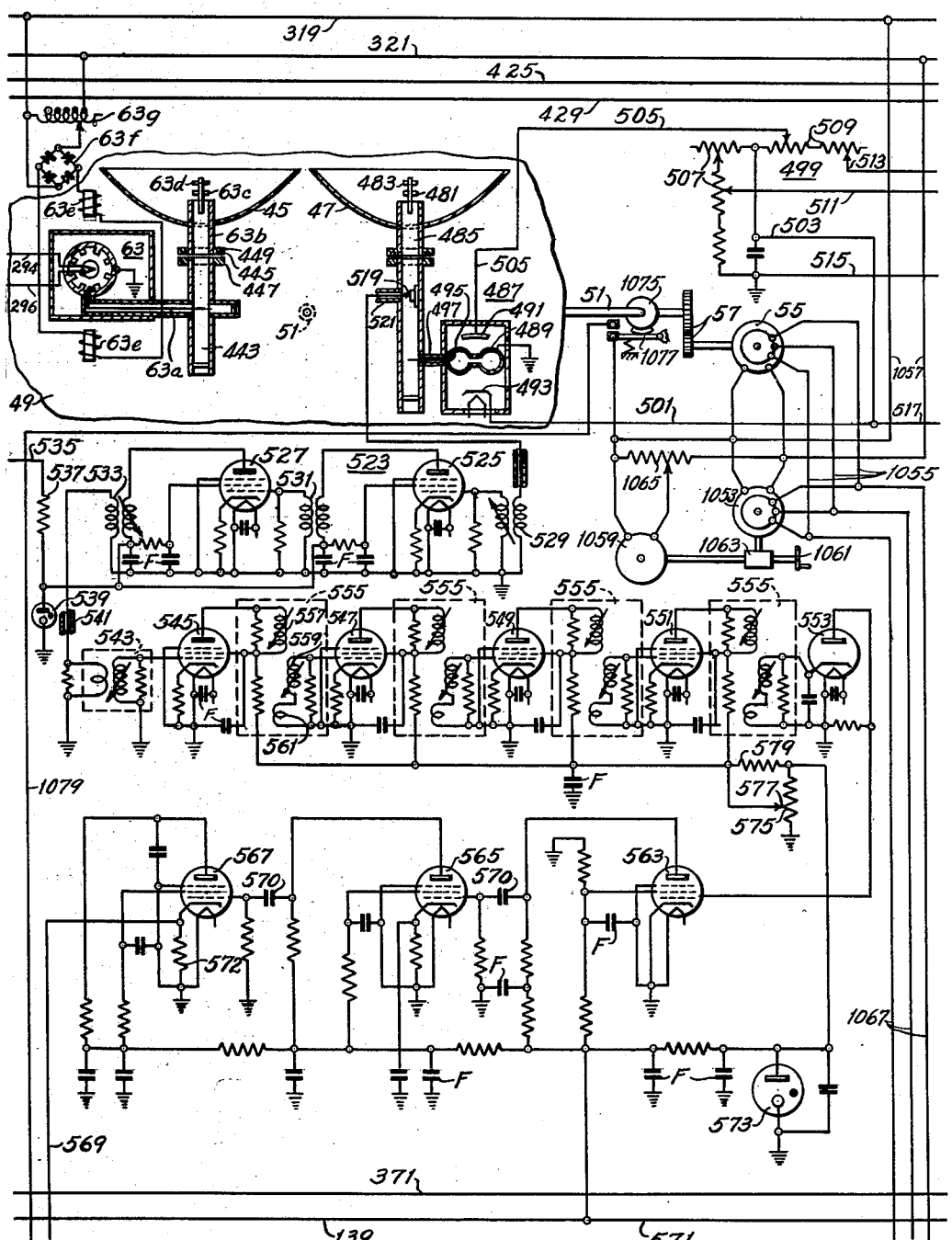
Figure 9:
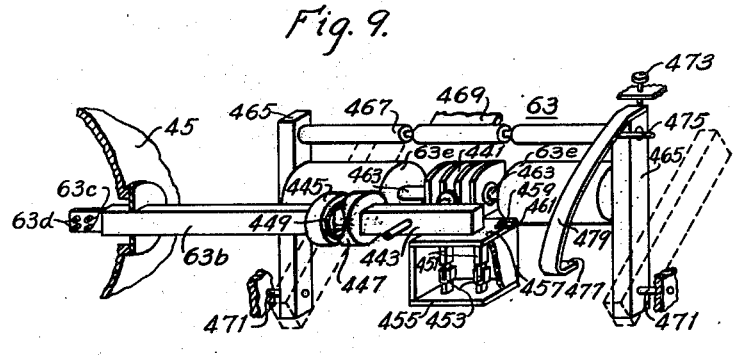
Figures 13, 13A:
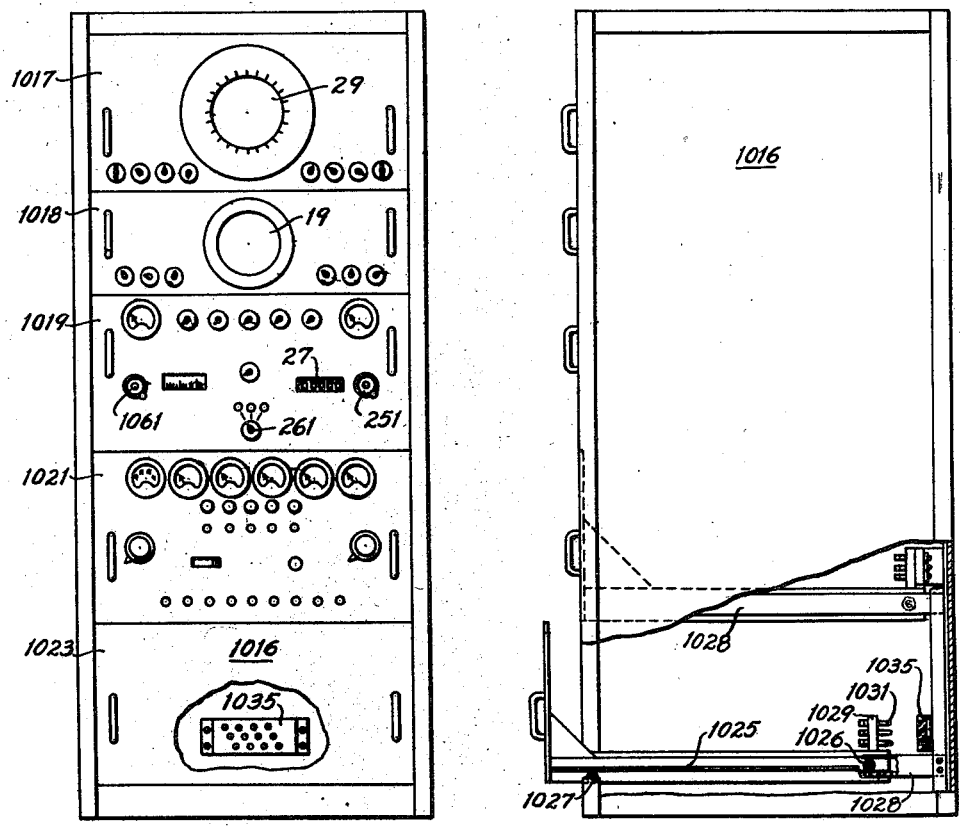
Figure 11:
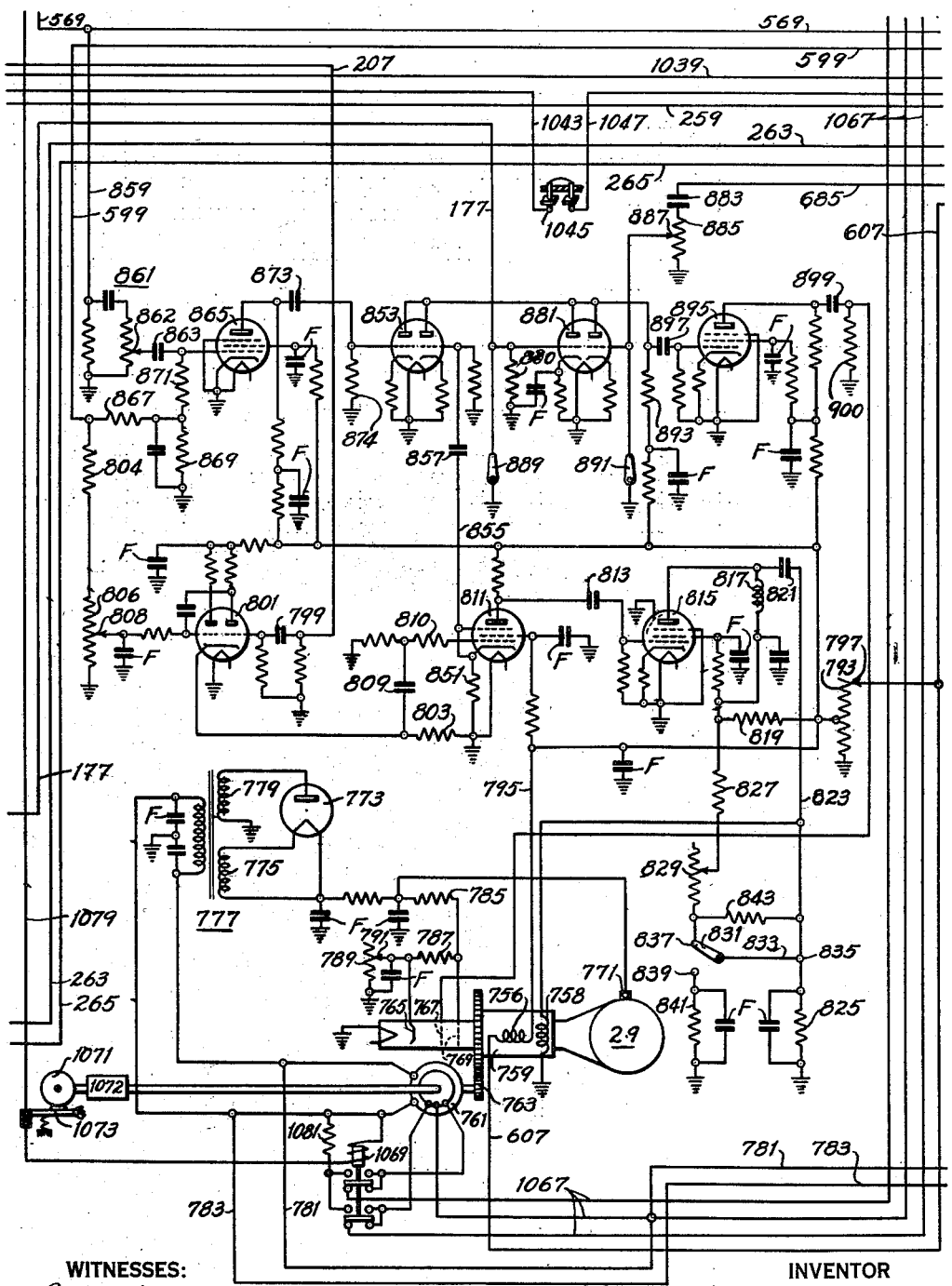
Figure 12:
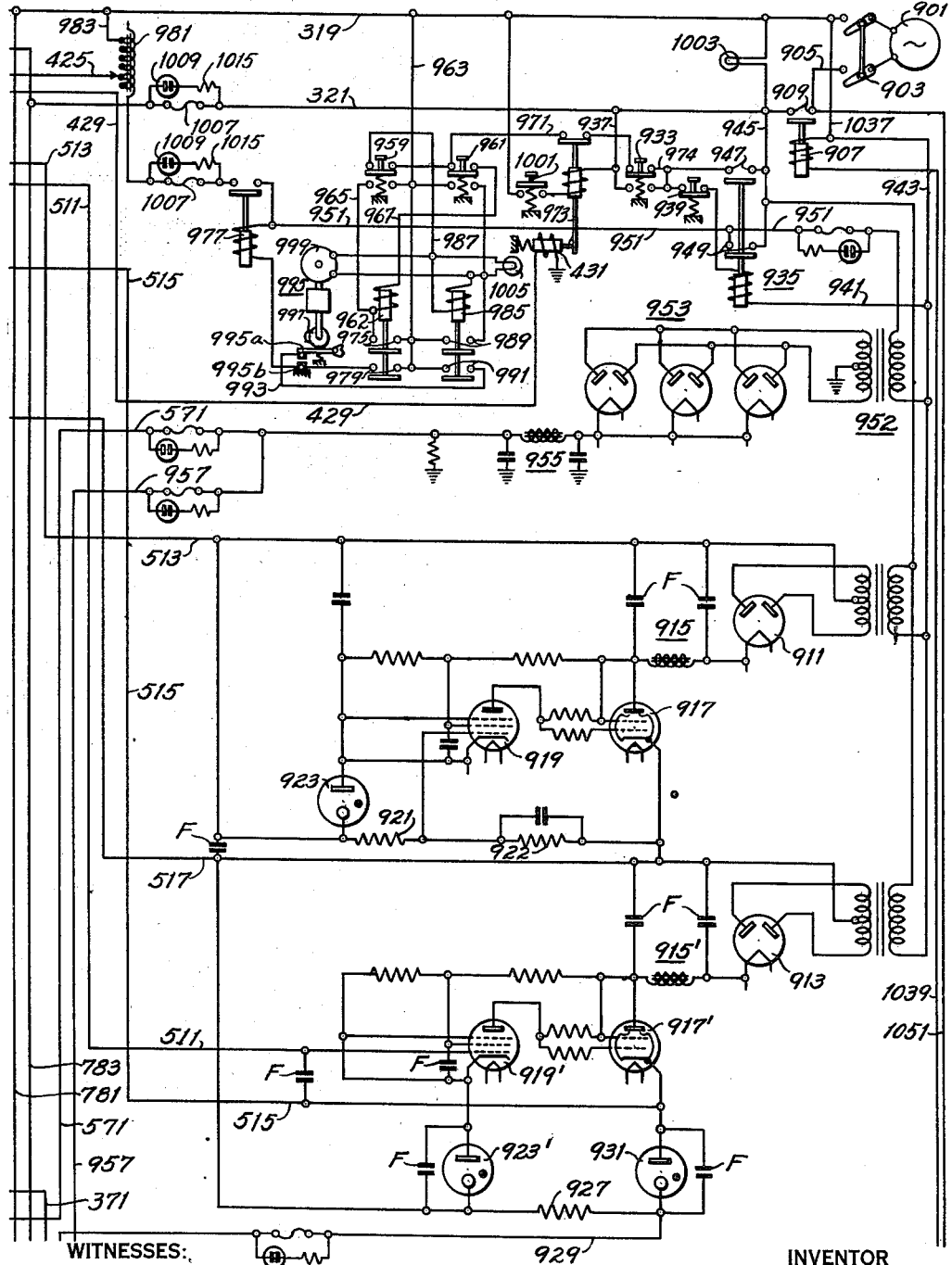

Other objects of the invention will be apparent from the following description taken in conjunction with the accompanying drawings, in which:

Figs. 1a, 1b, 1c and 1d are a related series of graphical representations showing the relationships between repetitive quantities employed in the invention. In these graphical representations abscissae represent time and ordinates voltage, Fig. 2 is a graphical representation of a combination of alternating voltages employed in the invention. In Fig. 2, abscissae represent time and ordinates voltage, Fig. 3 is a view in front elevation of a range indicator suitable for my invention, Fig. 4 is a view in front elevation of an additional indicator suitable for presenting information in accordance with the invention, Fig. 5 is a block diagram of an entire position locating device embodying the invention, Fig. 5a is a view in perspective of an antenna assembly employed for locating objects, Fig. 6 is a schematic view of a synchronizer suitable for the system illustrated in Fig. 5, Fig. 7 is a schematic view of a modulator suitable for inclusion in the system of Fig. 5, Fig. 8 is a schematic view with parts in section of an antenna assembly and receiver embodying the invention, Fig. 9 is a detail view in elevation of a mounting for a magnetron transmitting tube suitable for inclusion in the system of Fig. 5, Fig. 10 is a schematic view of a range oscilloscope and associated circuits suitable for the system for Fig. 5, Fig. 11 is a schematic view of a position indicator oscilloscope and associated circuits suitable for the system illustrated in Fig. 5, Fig. 12 is a schematic view of a control and power supply unit suitable for inclusion in the system of Fig. 5, and Figs. 13 and 13a are views in front and side elevation with parts broken away of a housing for parts of the system illustrated in Fig. 5.

To facilitate an understanding of the drawings, certain of the drawings are so laid out that when placed in side-by-side relationship circuits may be traced continuously from one sheet to an adjacent sheet of the drawings. In studying the drawings, it is suggested that Fig. 11 be placed on the right of Fig. 6, and that Fig. 10 be placed on the right of Fig. 11. Figs. 7, 8 and 12 may then be placed, respectively, above Figs. 6, 11 and 10. The resulting block of 6 figures then show in some detail a substantial part of the invention.

*General discussion of the system*

The basic system employed for the purpose of locating objects may be understood by reference to Figs. 1a, 1b, 1c and 1d. In Fig. 1a, a repetitive quantity is illustrated in a graphical representation wherein abscissae represent time and ordinates represent the magnitude of the repetitive quantity. For the purpose of discussion, it will be assumed that the repetitive quantity 1 comprises a plurality of voltage pulses having a constantly accurate period of repetition. These pulses, which may be termed "fixed pulses," are employed for controlling the emission of radiated electrical pulses of high frequency electromagnetic waves from an observation station towards an object to be located. The radiated pulses 3 are indicated in Fig. 1b, wherein the abscissae and ordinates are similar to those employed in Fig. 1a. As representative of suitable parameters, the pulses 3 may have a duration of one microsecond and may have a frequency of repetition of 911 pulses per second. In Fig. 1b each rectangular outline 3 represents a pulse containing a number of high frequency electromagnetic wave oscillations.

When the pulses 3 strike an object distant from the observation station, reflections or echoes are produced which return to the station in the form of a series of reflected pulses 5, as illustrated in Fig. 1c. The reflected pulses 5 differ in phase from the transmitted pulses 3 by a time interval T required for the transmitted pulses to travel from the observation station to the object and for the reflected pulses to travel from the object to the observation station. Since the rate of travel of these pulses is substantially 186,000 miles per second, the time interval T is a measure of the distance from the observation station to the object.

In order to measure the time interval T, a plurality of repetitive pulses 7 are produced, as illustrated in Fig. 1d. These pulses 7 have a frequency of repetition similar to that of the pulses 1. In addition, the pulses 7 are adjustable in phase in an accurately ascertainable manner with respect to the fixed pulses 1. The pulses 7 are adjusted in phase until they occupy the positions 7' indicated in dotted lines in Fig. 1d. These positions are such that a predetermined relationship exists between the movable pulses 7 and the reflected pulses 5. For the purpose of discussion, it will be assumed that this predetermined relationship is such that the front edges of pairs of the pulses 5 and 7' are in alignment or in phase with each other. Such alignment may be observed in a cathode-ray oscilloscope as will be pointed out in detail below. The phase displacement of the movable pulses 7 required to bring them into the position illustrated in dotted lines in Fig. 1d is a measure of the time T, and since the displacement can be ascertained, the location of the object with reference to the observation station may be determined.

For accurate determination of location, it is desirable that the pulses 1 and 7 have constantly accurate frequencies of repetition. The distance between adjacent pulses preferably is such that a radiated pulse may be transmitted from the observation station to the most distant object to be located and the reflected pulse may travel to the observation station before a second radiated pulse is started towards the object. It has been assumed that the pulses 3 repeat at a rate of 911 pulses per second which corresponds to a time between adjacent pulses of about 1/911 second. This time is sufficient for a pulse 3 to travel to an object approximately 180,000 yards from the observation station and for the reflected pulse 5 to travel from the object to the observation station before a succeeding radiated pulse is started towards the object. It is desirable also that the various pulses occupy a small proportion of the distance between adjacent pulses. The desired structure of the pulses may be understood more clearly by a consideration of Fig. 2.

In Fig. 2, abscissae again represent time and ordinates represent voltage. A curve 9 is represented in Fig. 2 which constitutes 1/12 of a cycle of a sine wave having a frequency of alternation of 911 cycles per second. Consequently, the portion of the cycle represented in Fig. 2 constitutes 30 electrical degrees and represents the positive peak or crest of the cycle. It will be observed that the ordinates of the curve 9 differ in magnitude by such a slight amount that it would be difficult, if not impossible, to distinguish accurately between ordinates occurring within the 30° range illustrated in Fig. 2. These 30° represent a time sufficient for a radiated pulse to travel approximately 15,000 yards. For this reason, it would be difficult to determine accurately the distance of an object from the observation station if one of the pulses to be compared possessed the desired repetition rate of 911 pulses per second but had a configuration corresponding to the sine wave 9 illustrated in Fig. 2.

Let it be assumed next that a sine wave 11 is superimposed on the sine wave 9, and that the sine wave 11 has a frequency of alternation substantially higher than that of the sine wave 9. Let it be assumed further, that the frequencies and phase relationships between the waves are selected to bring the crests or peaks of the waves into alignment at each of a plurality of crests of the sine wave 9. Although these peaks or crests may be negative or positive peaks or crests, it will be assumed for the purpose of discussion that the positive peaks or crests are employed. The sine waves 9 and 11 are illustrated as having substantially equal amplitudes.

By inspection of Fig. 2, it will be observed that the addition of the sine wave 11 to the sine wave 9 produces a resultant peak or crest having a much larger rate of change of ordinate with respect to time than that possessed by the sine wave 9. Consequently, it would be somewhat easier to distinguish between adjacent ordinates of the resultant peak or crest than between corresponding ordinates of the sine wave 9 alone. At the same time, the resultant peak or crest formed by the sine waves has a frequency of repetition which is determined in part by the sine wave 9. For example, by suitable selection of the frequencies of the two waves, it is possible to have a resultant peak or crest similar to that illustrated in Fig. 2 which repeats at each positive peak of the sine wave 9.

If a sine wave 13, which has a substantially higher frequency of alternation than that of the sine wave 11, is added to the sine waves 9 and 11, a still sharper resultant peak may be formed by the combination of the three sine waves which still repeats at a rate of 911 repetitions per second.

In Fig. 2 the sine wave 13 is shown superimposed on the sine wave 9 and its outline represents, therefore, the sum of the three waves 9, 11 and 13. A still higher frequency sine wave 15 is superimposed on the sine wave 13, and the outline of the wave 15 (shown in full lines) with respect to the coordinate time and amplitude axes of Fig. 2 represents the resultant of the four sine waves 9, 11, 13 and 15.

Let it be assumed that all positive peaks having an amplitude greater than the voltage represented by the dash line 17 of Fig. 2 are segregated from the remainder of the sine waves. The segregated peaks would be extremely sharp in contour and by proper selection of the frequencies of the component waves, the segregated peaks may be given a frequency of repetition of 911 cycles per second.

The results obtained by pyramiding a plurality of sine waves may be understood more clearly by the assignment of specific values to the various waves. Let it be assumed that the sine wave 9 has a frequency of 911 cycles per second; the sine wave 11 has a frequency of 5.46 kilocycles per second; the sine wave 13 has a frequency of 32.79 kilocycles per second, and the sine wave 15 has a frequency of 196.72 kilocycles per second. These frequencies are so selected that the frequency of the sine wave 11 is 6 times that of the sine wave 9, the frequency of the sine wave 13 is 6 times that of the sine wave 11, and the frequency of the sine wave 15 is 6 times that of the sine wave 13. If the sine waves have phase relationships selected to bring their positive peaks or crests into alignment at each of the positive peaks or crests of the sine wave 9, the resultant peaks segregated by the line 17 have a contour determined substantially by the contour of the sine wave 15, but have a frequency of repetition equal to the frequency of the sine wave 9. It will be observed that the 30 electrical degrees of the sine wave 9 corresponds to ½ cycle of the sine wave 11, 3 cycles of the sine wave 13, and 18 cycles of the sine wave 15.

As previously pointed out, the time represented by one cycle of the sine wave 9 is sufficient for radiation to travel to an object displaced from the transmitting station by 180,000 yards and to return to the transmitting station. On a similar basis, one cycle of the sine wave 11 corresponds to 30,000 yards spacing, one cycle of the sine wave 13 corresponds to a 5,000 yard spacing and one cycle of the sine wave 15 corresponds to an 833 yard spacing. To obtain a 50 yard accuracy of the locating device by selecting portions of a cycle corresponding to a distance of 180,000 yards such as the cycle represented by the sine wave 9, errors must be maintained below .03%. On the other hand, to obtain the 50 yard accuracy by comparing ordinates of a cycle corresponding to 883 yards, such as represented by the curve 15, errors may be as high as 6%. Consequently, if pulses similar to those segregated by the line 17 are employed for reference purposes, it becomes possible to achieve the desired accuracy.

The pulses are formed by combining a plurality of sine waves. For this reason, it is possible to change the phase relationship between two sets of pulses similar to the pulses 1 by controlling the phase relationships of the component sine waves forming one set of pulses with respect to the component sine waves forming the remaining set of pulses. Let it be assumed that four phase shifters are provided having sine wave outputs corresponding, respectively, to the sine waves 9, 11, 13 and 15. Let it be assumed further that the phase shifters are adjustable for shifting the phases of the output sine waves with respect to the input sine waves at rates such that the phase relationships between the output sine waves remain similar to the phase relationships between the input sine waves. This means that adjustment of the phase shifters operates to shift the entire pyramid of Fig. 2 along the time axis. If the input sine waves are combined to form the pulses 1 and the output sine waves are combined to form similar pulses, which serve as the pulses 7 of Fig. 1d, adjustment of the phase shifters serves to vary the timing or phase relationship of the pulses 7 with respect to the pulses 1. In this manner, the addition of sine waves may be employed for providing accurately timed pulses corresponding to the fixed pulses 1 and the movable pulses 7 of Figs. 1a and 1d.

The information desired from the system may be presented in the form illustrated in Figs. 3 and 4. In Fig. 3, the screen of a cathode-ray oscilloscope 19 is illustrated. This screen has a trace initiated at a point 21 thereon and terminating at a point 23. The initiation of each of the horizontal traces is controlled by each of the movable pulses 7 of Fig. 1d. At a predetermined point in the trace, a discontinuity is provided for reference purposes. This discontinuity may take the form of a substantially vertical break 25. Since the vertical break has a definite position with respect to the movable pulse 7 of Fig. 1d, the timing of the vertical break with respect to a standard (such as the fixed pulses 1 of Fig. 1a) may be controlled by adjustment of the movable pulse.

The reflected or echo pulses 5 of Fig. 1c are employed for vertically deflecting the trace. By adjustment of the movable pulses 7, the vertical break 25 may be brought to a predetermined relationship with respect to the pulses 5. For example, this relationship may be such that the leading edge of the pulse 5 substantially coincides with the vertical break 25. When this adjustment has been effected, the the phase displacement between the adjusted movable pulses 7' and the standard (which corresponds to the fixed pulses 1 of Fig. 1a) represents the time T required for electromagnetic radiation to travel from the observation station to the object to be located and for the reflection or echo pulse to return to the observation station. This time T may be indicated on a suitable register 27 (Fig. 3). Since the time is a measure of the distance from the observation station to the object to be located, the register 27 may be calibrated directly in linear units such as yards to indicate directly the desired distance. Since the oscilloscope of Fig. 3 is used in the determination of the distance or range of the object to be located with reference to the observation station, it is termed a "range scope."

Fig. 4 shows the screen of a cathode-ray oscilloscope 29. In this oscilloscope the path travelled by the electron beam is initiated at the center point 31 of the screen and travels radially away from this center point. The radial direction is controlled by the direction of emission of the electromagnetic radiation from the observation station. For this reason, the screen may be provided with a scale 33 for indicating the direction taken by the radiation. As shown in Fig. 4, the scale is calibrated in degrees over a complete range of 360°. If the system is installed on land, such as an island, the zero degree direction may be any desired reference direction such as north. If the system is installed on a ship, the zero degree direction may correspond to the heading of the ship.

The electron beam in the oscilloscope 29 normally is adjusted to an intensity sufficiently low to leave no trace or to leave a barely visible trace on the screen. Each deflection of the electron beam from the point 31 is initiated by one of the fixed pulses 1 of Fig. 1a. The time required for the electron beam to travel from the center to the rim of the oscilloscope screen is sufficient to permit a radiated pulse to travel from the observation station to the most distant object which is to be located, and to permit the resulting reflected pulse or signal to return from such object to the observation station. When electromagnetic radiation strikes an object and produces reflected or echo waves, the reflected or echo waves are detected and are applied to the oscilloscope to increase the intensity of the electron beam. Consequently, a dot on the screen of the oscilloscope indicates the presence of an object in the path of the electromagnetic radiation. In Fig. 4, two such dots 35 and 37 are illustrated. The bearing of the dot 37 is represented by the angle $\theta$ and the distance from the observation station to the object is represented by the distance between the center point 31 and the dot 37.

In normal operation, directional electromagnetic radiation will be produced and the direction of emission of the radiation will be varied to scan a predetermined area. This scanning may take place in a vertical plane for the purpose of determining elevation or in a horizontal plane for the purpose of determining azimuth. If desired, the scanning may be in some intermediate plane or may be directed in other scanning paths for the purpose of covering any desired area. For the purpose of discussion, it will be assumed that scanning takes place in a horizontal plane for the purpose of determining azimuth.

In order to indicate more accurately the range of the object to be located on the screen of Fig. 4, a series of range dots may be produced on the surface of the screen. Such range dots may be produced by increasing the intensity of the electron beam when the beam has been deflected from the center point 31 of the screen for a predetermined distance. If a long-persistence fluorescent material is employed for the screen, the dots remain visible for an appreciable time. During scanning operations, since the direction of deflection of the electron beam rotates continuously about the center of the screen, the range dots tend to produce a series of circles 39 and 41, which are indicated by dotted lines in Fig. 4. As a specific example, the line 39 may represent the locus of dots showing objects 5000 yards from the observation station, and the line 41 may represent the locus of dots showing objects 10,000 yards from the observation station. This means that the dot 37 indicates that an object is located approximately 7000 yards from the observation station at a bearing of approximately 45°.

To facilitate further the determination of the range of the object from the observation station, the intensity of the electron beam in the oscilloscope 29 may be increased at instants determined by the break 25 in the range scope of Fig. 3. This increase in intensity produces a dot which, when the direction of radiation from the observation station rotates, sweeps about the screen in a path represented in Fig. 4 by the circle 43. By adjusting the timing of the vertical break in the manner previously discussed, the radius of the circle 43 (Fig. 4) is varied. The circle 43 indicates the locus of dots showing objects spaced from the observation station by a distance equal to that shown on the register 27 (Fig. 3). For example, the radius of the circle 43 may be adjusted until the circle passes through the dot 37. The range represented by the dot 37 then may be read directly from the register 27 of Fig. 3. If a more accurate determination of range is desired, the radius of the circle 43 is first adjusted to pass through the desired dot, such as the dot 37. This places the desired reflected signal or pulse 5 on the range scope (Fig. 3). The range scope then may be adjusted as previously explained, to show accurately on the register 27 the desired range.

The screen of Fig. 4 in effect represents a polar map of the area to be scanned with the observer located at the center point 31. For this reason the oscilloscope 29 is designated a plan position indicator or "P. P. I. scope."

Block diagram of system

The entire system is illustrated in Fig. 5 in the form of a block diagram. In this system, a directional antenna 45 is provided for directing pulsed electromagnetic radiation towards an object to be located which is represented in Fig. 5a by a ship 46. For high-frequency electromagnetic radiation, the directional antenna may take the form or a parabola. A similar antenna or parabola 47 may be provided for receiving reflections or echoes from the object to be located.

To facilitate the scanning of a large area, the parabolas 45 and 47 are mounted on a platform 49 (Fig. 5a). This platform is supported on a column 51 which is rotatably positioned in a bearing 53. A suitable motor, such as a position motor 55, is coupled to the column 51 by gearing 57 to rotate the platform about the axis of the column. Electrical connections between equipment on the platform 49 and stationary equipment may be effected through slip rings 59 which are carried by the column 51 and which are insulated from each other. Each slip ring may be connected to equipment on the platform 49 and a connection from such slip ring to stationary equipment may be completed through a brush 59a The platform 49 may be adjustable about an axis 61 for the purpose of adjusting the angle of elevation of the radiation emitted and received by the parabolas. If the platform 49 is mounted on land, as on an island, for the purpose of scanning the surface of the sea surrounding the island, the platform may be adjusted about the axis 61 into a substantially horizontal plane. If the platform 49 is mounted on a ship for the purpose of scanning the surface of the sea about the ship, the platform may be adjusted similarly in a horizontal plane for operation in smooth waters. If the platform is to be employed under such circumstances in rough waters, it may be desirable to stabilize the platform 49 about the axis 61 in order to maintain the radiation substantially parallel to the surface of the sea. For the purpose of discussion, it will be assumed that the platform 49 is mounted on a land base such as on an island. To scan completely the area surrounding the island, it is desirable that the platform be so mounted that no object on the island is in the path of radiation. This may necessitate the mounting of the platform at a high elevation on the island.

Energy to be radiated from the parabola 45 may be supplied by a suitable oscillator, such as a magnetron 63, having a pulsed output controlled by a pulser or modulator 65. The magnetron 63 may be designed to produce an output at a frequency such as 9000 megacycles per second.

Reflected or echo pulses received by the parabola 47 may be mixed in a mixer 67 with the output of a local oscillator 69 to produce an intermediate frequency of the order of 30 megacycles per second. This intermediate frequency is amplified in a preamplifier and in an intermediate frequency amplifier 71. The output of the intermediate frequency amplifier is detected and amplified further in a video amplifier 72. The output of the video amplifier is employed for controlling the intensity of the electron beam in the P. P. I. scope 29 and for producing a vertical deflection in the range scope 19.

Since the deflection of the electron beam in the P. P. I. scope 29 is to be in a direction corresponding to the direction of the path of radiation from the parabola 45, the position motor 55 controlling the rotation of the platform 49 is suitably coupled to a position motor 73 which is employed for rotating a yoke 75 which supports the sweep coils for the P. P. I. scope 29.

The timing of the operations of various parts of the system is controlled by a synchronizer 77. This synchronizer includes devices for producing oscillations at four different frequencies. Although separate stable oscillators may be provided for the desired frequencies, preferably a standard or master oscillator is provided from which the remaining oscillations are derived by suitable frequency multiplying or dividing devices. In the specific synchronizer of Fig. 7 a master oscillator 79 is provided for generating an oscillation at a suitable frequency such as 196.7 kilocycles per second.

A divider device 81 is provided for producing an output oscillation having a frequency ⅙ that of the master oscillator. A portion of the output of the divider device 81 again is divided by a divider device 83 for producing an output oscillation having a frequency ⅙ that obtained from the divider device 81. The final divider device 85 is provided for deriving from a portion of the output of the divider device 83 an oscillation having a frequency ⅙ that of the oscillation output of the divider device 83. These four oscillations correspond to the four sine waves 9, 11, 13 and 15 of Fig. 2. They are added by an adder device 87 (Fig. 5) and clipped by a clipper device 89 to produce a series of fixed pulses corresponding to the pulses 1 of Fig. 1a. These fixed pulses are employed for triggering or controlling the modulator 65 for the purpose of timing the pulses emitted by the parabola 45. In addition, the fixed pulses are employed for initiating deflection of the electron beam in the P. P. I. scope 29. It should be understood further that the fixed pulse controls an unblanking pulse which permits the electron beams of the P. P. I. scope 29 to be effective only during one direction of travel thereof.

A portion of the outputs of the master oscillator and the divider devices 81, 83 and 85 are passed, respectively, through phase shifters or goniometers 91, 93, 95 and 97. The outputs of the goniometers are added in an adder device 99 and clipped in a clipper device 101 to provide a series of movable pulses corresponding to the movable pulses 7 of Fig. 1d. These movable pulses are employed for initiating the horizontal sweep in the range scope 19 and for controlling the timing of the vertical break in the trace of the range scope. In addition, the movable pulses initiate an unblanking pulse permitting the electron beam in the range scope to be effective in only one direction of travel thereof.

As previously pointed out, the mechanism for controlling the vertical break in the range scope also is employed for controlling a movable range ring in the P. P. I. scope. The fixed range rings in the P. P. I. scope are derived from a portion of the output of the divider device 81 in the synchronizer. The relationship of the parts employed in the system having been set forth, it is believed that each part now may be described in detail.

*Synchronizer*

The synchronizer 77 of Fig. 5 is shown in greater detail in Fig. 6. As previously pointed out, the synchronizer produces a series of fixed pulses and a series of movable pulses which are adjustable in phase with respect to the fixed pulses. The fixed pulses are employed for:

(1) Controlling the modulator to time the pulses emitted by the transmitting parabola 45, (2) Initiating the sweep or deflection of the electron beam in the P. P. I. scope, and (3) Controlling the timing of unblanking pulses supplied to the P. P. I. scope.

The synchronizer also supplies an output for controlling the fixed range rings for the P. P. I. scope.

The movable pulses are adjustable in phase with respect to the fixed pulses. They are employed for:

(1) Initiating the horizontal sweep or deflection in the range scope, (2) Controlling the timing of (*a*) the vertical break in the trace on the range scope, (*b*) the movable range ring for the P. P. I. scope, and (3) Controlling the supply of an unblanking pulse to the range scope.

Referring to Fig. 6, the master oscillator 79 may be of any suitable stable type. If mechanically feasible, a crystal may be employed for controlling the frequency of the oscillator 79 in a manner well known in the art. The specific oscillator illustrated is of the electron-coupled type having a tank circuit 105 adjusted to produce a frequency of oscillation of 196.72 kilocycles per second. The output of the master oscillator 79 is coupled through a coupling condenser 107 and a resistor 109 to the control grid 111 of one section of a dual amplifier tube 113. Since the wave form of the master oscillator may be poor, it may be desirable to provide a suitable filter circuit 115 for the purpose of improving the wave form of the oscillation supplied to the grid 111.

A portion of the output of the master oscillator 79 also is coupled through a coupling condenser 117 to the input grid of the divider device 81. The divider device 81 is in the form of a multivibrator. Preferably this multivibrator is of the cathode-coupled type illustrated in Fig. 6. The cathode resistor 119 preferably is adjustable for the purpose of controlling the frequency of the output oscillation derived from the multivibrator 81. The cathode-coupled type of multivibrator is desirable for the reason that the input grid 118 and the output plate 121 thereof are completely free. It will be observed that the multivibrator includes a suitable grid leak 123, a voltage divider including the resistors 125, 127 and 137 for biasing the grids suitably and a grid resistor 129. The multivibrator may be formed of a dual-triode electron tube, as illustrated, wherein the plate of the first section is coupled to the grid of the second section of the tube through a coupling condenser 131. Suitable plate resistors 133 and 135 together with the resistor 137 also are provided for the plate circuits. In addition, filter or bypass condensers 138 are suitably located in the multivibrator circuit.

The plate voltage for the multivibrator 81 and for the master oscillator 79 is derived from a conductor 139 which is at a predetermined direct voltage with respect to ground depending upon the plate supply requirements of the tubes employed. The conductor 139 is connected to the plate circuits of the tubes through a dropping resistor 141, and conductors 143, 145, 146 and 147. A voltage regulator tube 149 is associated with the dropping resistor for the purpose of providing a constant voltage supply for the plate circuits of the various tubes. The voltage regulator tube 149 may be of the conventional gaseous type, the gaseous content of which is indicated in a conventional manner by means of a dot positioned within the envelope of the tube. A suitable decoupling resistor 151 and a plate resistor 153 are indicated for the master oscillator 79. Since filter or bypass condensers are used widely in high-frequency electronic circuits, such condensers will be indicated by the reference character F. Furthermore, when grid leaks, coupling condensers and plate resistors are associated with electron tubes in a conventional manner they are indicated by conventional symbols on the drawings.

The output plate of the multivibrator 81 is coupled through a coupling condenser 155 to the input grid 157 of a dual-triode tube 158 which may be substantially similar to the tube 113. A portion of the output of the multivibrator 81 also is coupled through a coupling condenser 159 to the input grid of the divider device 83. This divider device is illustrated as a multivibrator similar in general to the multivibrator 81. For this reason, a detailed description of the multivibrator 83 is believed to be unnecessary.

The output plate of the multivibrator 83 is coupled through a coupling condenser 161 and grid resistors to the grid 163 of a dual triode tube 165. A portion of the output of the multivibrator 83 is coupled through a condenser 167 to the input grid of the divider device 85. This divider device 85 is a multivibrator similar in general to the multivibrators 81 and 83. The output plate of the multivibrator 85 is coupled through a condenser 169 and a grid resistor to the grid 171 of one section of a dual triode tube 173.

As previously pointed out, the master oscillator 79 and the divider devices 81, 83 and 85 produce oscillations having frequencies of respectively 196.72 kilocycles, 32.79 kilocycles, 5.47 kilocycles and 911 cycles per second. The time represented by one cycle of each of these frequencies is sufficient for radiation to travel from an observing station to an object and to return to the observing station when the distances from the object to the observing station are, respectively, 833 yards, 5000 yards, 30,000 yards and 180,000 yards. Since one cycle of the output of the divider device 81 corresponds to a range of 5000 yards, the output may be employed for producing 5000 yards range rings on the P. P. I. scope. For this reason, a portion of the output of the multivibrator 81 is coupled through a condenser 175 to a conductor 177. This conductor is associated with the P. P. I. scope in a manner discussed below.

Plate voltage is supplied to the plates associated with the grids 111, 157 and 163 of the tubes 113, 158 and 165 from the source regulated by the voltage regulator tube 149. The connection may be traced from the conductor 143, through the conductor 145 and a conductor 179 to the plates. Suitable decoupling resistors are located in this circuit. In addition, the conductor 143 supplies plate voltage to the plate 173a associated with the grid 171 of the tube 173. It will be observed that these plates 113a, 158a, 165a and 173a are connected effectively to a common source through a common load resistor 180. The output currents of the plates 113a, 158a, 165a and 173a are combined in the load resistor to produce a resultant voltage between the conductor 181 and ground which is dependent on the sum of the outputs of the respective plates. Additional load resistors 182 may be employed for certain of the plate circuits to adjust the contribution from each tube to the resultant voltage. The conductor 181 is coupled through a condenser 183 to the input grid of a pentode amplifier tube 185 which may constitute a part of the adder device 87. The amplifier tube 185 may be connected to produce differential amplification of the input signal. Such differential amplification exaggerates the difference betwen peak amplitudes and small amplitudes of the input signal. It has been found, however, that adequate performance may be obtained if the amplifier tube 185 is arranged for linear amplification. Since the amplifier tube 185 is illustrated as connected in a conventional manner, a detailed description thereof appears unnecessary.

The output of the amplifier tube 185 is coupled through a condenser 187 to the control grid of the clipper tube 89. The function of the clipper tube may be understood by reference to Fig. 2. The input to the slipper tube 89 has a form similar to that illustrated by the full line 15 of Fig. 2. It will be recalled that this full line has a configuration obtained by adding four sine waves differing in frequency to form repetitive sharply defined peaks 1. The control grid of the tube 89 is biased negatively to a value such that the applied voltage must have a magnitude above that represented by the line 17 in Fig. 2, before the tube can conduct. For this reason, the clipper tube 89 passes only that portion of the pulse 1 which is above the line 17 in Fig. 2.

Referring again to Fig. 6, it will be observed that the clipper tube 89 has associated therewith a grid leak 189 and a biasing resistor 191 which is bypassed by a condenser 193. As previously explained, the resistor 191 has a value such that plate current flowing therethrough biases the control grid of the clipper tube 89 negatively relative to the associated cathode past the cutoff point by an amount sufficient to produce the desired clipping action. The condenser 193 maintains adequate bias between plate current peaks.

In order to assure the formation of a sharply defined pulse, the output of the clipper tube 89 may be coupled through a condenser 195 to the control grid of an amplifier tube 197. This amplifier tube 197 and its associated circuits may be arranged to amplify the input signal linearly. The tube 197 is similar in function to the tube 185.

The output of the tube 197 is coupled through a condenser 199 to the control grid of a second clipper tube 89a. This clipper tube 89a is biased slightly past cutoff to permit passage only of a sharply defined pulse. The operation of the clipper tube 89a is substantially similar to that of the tube 89. The biases of the clipper tubes 89 and 89a are proportioned to permit passage of only the most positive portions of the input signals. These biases are produced as above set forth with respect to the tube 89.

A portion of the output of the final clipper tube 89a is supplied through a coupling condenser 201 to a conductor 203. A second portion of the output of the final clipper tube is coupled through a condenser 205 to a conductor 207. The pulses applied to the conductors 203 and 207 may be termed "fixed pulses" and are employed for control operations which have been set forth generally above, and which will be described in greater detail below.

The plates of the tubes 185, 89 and 197 are connected through suitable plate resistors and decoupling resistors to the conductor 147 for energization from the source of plate voltage regulated by the voltage regulator tube 149.

Returning now to the tube 113, it will be observed that the cathode 113c of this tube is connected through a phase-splitting network 209 to the fixed coils 210 and 211 of the phase shifter or goniometer 91. As understood in the art, the fixed coils of the goniometer are positioned to establish fields in directions at right angles to each other. Furthermore, the currents passing through the coils differ in electrical phase by 90° in order to establish an electrical quadrature phase relationship between the magnetic fields produced by the fixed coils. A movable coil 213 is mounted for rotation in the resultant magnetic field produced by the two fixed coils 210 and 211. As the movable coil 213 rotates from a position in alignment with one of the fixed coils to a position in alignment with the other of the fixed coils, the voltage induced in the movable coil varies in phase gradually through a range of 90 electrical degrees. As the movable coil continues to rotate, the induced voltage in the movable coil 213 continues to change in phase through a full 360° or more depending on the extent of rotation of the movable coil. Since it is desired that the movable coil 213 be capable of continuous rotation, connections to the movable coil preferably are effected through slip rings. The construction of a goniometer of this type is understood in the art.

The phase splitting network 209 includes three resistors 215, 217 and 219 in addition to a condenser 221. The phase splitting network cooperates with the inductive reactances of the fixed windings 210 and 211 to produce a current in the fixed winding 211 which leads the voltage between the cathode 113b and ground by 45° and a current in the fixed coil 210 which lags this voltage by 45°. Consequently, the currents through the fixed windings 210 and 211 are electrically in quadrature with each other.

In a similar manner, the cathodes 158c, 165c and 173c of the tubes 158, 165 and 173 are associated, respectively, with phase splitting networks 223, 225 and 227 and the goniometers 93, 95 and 97. Since the frequencies for the goniometers 95 and 97 are substantially lower than those applied to the goniometers 91 and 93, the resistors in the phase splitting networks 225 and 227 may be arranged somewhat differently, as illustrated in the drawings.

The outputs of the movable coils of the goniometers 91, 93, 95 and 97 are connected, respectively, to the control grids 113b, 158b, 165b and 173b in the second sections of the dual-triode tubes 113, 158, 165 and 173. The plates of these second sections may be all connected through conductors 237 and 229, resistors 231 and a dropping resistor 233 to the conductor 139. It will be recalled that the conductor 139 has a positive voltage with respect to ground. A voltage regulator 235 cooperates with the dropping resistor 233 to maintain the voltage applied to the various tubes substantially constant.

It will be understood that the voltages applied between the control grids 113b, 158b, 165b and 173b and their respective cathodes are equal in frequency but adjustable in phase with respect to the voltages applied, respectively, between the control grids 111, 157, 163 and 171 and their associated cathodes. The difference in phase between each pair of these voltages is determined by the adjustment of the associated goniometer.

The plates of the second sections of the tubes 113, 158, 165 and 173 are connected to the common load resistor 231 to produce between the conductor 237 and ground, a voltage which is a function of the additive output currents of such plates. This voltage is applied through a coupling condenser 239 across the grid resistor 241 of an amplifier tube 243 which forms part of the adder device 99. The output of the amplifier tube, which may have a linear amplifying characteristic, may be analyzed by reference to Fig. 2. The output has a form similar to that represented by the full-line curve 15 in Fig. 2. As previously explained, this full-line curve is formed by the addition of four sine waves differing in frequency.

The purpose of the goniometers 91, 93, 95 and 97 is to shift the phase relationships, respectively, of the four sine waves supplied thereto at rates such that the phase relationships between the four output sine waves are undisturbed. To this end, the goniometers are coupled by gearing 245, 247 and 249. The gearing between the goniometers 91 and 93 is such that the rotatable coil 213 of the goniometer 91 rotates six revolutions for each revolution of rotation of the movable coil of the goniometer 93. In a similar manner, the rate of rotation of the movable coil of the goniometer 95 is ⅙ that of the rotatable coil of the goniometer 93 and six times that of the movable coil of the goniometer 97.

It will be observed that the rates of rotation of the movable coils of the goniometers are proportional respectively to the frequencies of the oscillations supplied thereto. Consequently, when the goniometers are adjusted, as by rotation of a knob 251, the curves 9, 11, 13 and 15 in Fig. 2 move as a unit along the time axis. Consequently, the phase relationships between the four basic sine waves are undisturbed and the pyramid arrangement of the sine waves is also undisturbed. This means that the pulses corresponding to the pulses above the line 17 in Fig. 2 which are obtained by combining the outputs of the goniometers are adjustable in phase with respect to the corresponding pulses obtained by combining portions of the four generated sine waves. The adjustment of the goniometers may be indicated in any suitable manner as by connecting the register 27 to the knob 251 by means of suitable gearing 253.

The output of the amplifier tube 243 is clipped in the clipper tube 101 and the resulting clipped pulse is again amplified in the amplifier tube 255. The output of the amplifier tube 255 passes through the clipper tube 101a to form a sharply defined series of pulses. The tubes 101, 255 and 101a have the same functions as the tubes 89, 197 and 89a. For this reason, a detailed description of the tubes is believed unnecessary. It will be observed that the output of the final clipper tube 89a is a series of fixed pulses, whereas the output of the final clipper tube 101a is a series of pulses which are adjustable in phase with respect to the fixed pulses. For this reason, the outputs of the tubes 89a and 101a may be designated, respectively, as fixed pulses and movable pulses. The output of the final clipper tube 101a is coupled through a condenser 257 to a conductor 259. As previously pointed out, the movable pulses are supplied by the conductor 259 for certain control operations, and these operations are discussed in greater detail below.

The tubes 101, 255 and 101a may receive their plate voltage supply through the dropping resistor 233. In this manner, the low voltage plate voltage supply for the tubes which produce the movable pulse is effectively separated from that of the tubes which produce the fixed pulse. The final clipper tube 89a derives its plate voltage from the conductor 139, through suitable resistors and filters.

The frequency of the master oscillator 79 may be initially set at the factory and should not require subsequent adjustment thereafter. In case adjustment is required at any time, such adjustment may be effected in a known manner. In addition, it is desirable that the divider devices always divide their inputs in the ratio for which they are designed. To facilitate adjustment of the divider devices, an alignment switch 261 is provided for applying to a pair of conductors 263 and 265 pairs of oscillations derived from the four oscillations generated in the synchronizer. For example, in the position of the alignment switch 261 indicated in Fig. 6, the conductor 263 is connected through a conductor 267 and a condenser 269 to the cathode 113c. Consequently, the voltage across a resistor 271 which is connected between the conductor 267 and ground, or the voltage between the conductor 263 and ground, oscillates at the frequency of the master oscillator 79. In a similar manner, the conductor 265 is connected through the alignment switch, a conductor 273 and a condenser 275 to the cathode 158c. Therefore, the conductor 265 has a voltage to ground which oscillates at the frequency of the output of the voltage divider 81.

When the alignment switch 261 is actuated to engage the contacts 277 and 279, the conductor 263 has a voltage-to-ground which oscillates at the frequency of the output of the divider device 81, and the conductor 265 has a voltage-to-ground which oscillates at the frequency of the output of the divider device 83. It will be observed that the contact 279 is connected to the cathode 165c in a slightly different manner. No coupling condenser is required. This is for the reason that the frequency involved is substantially lower than that passed by the coupling condenser 275 or the condenser 269.

When the alignment switch 261 is actuated to engage its contacts 281 and 283, the conductors 263 and 265 are connected for energization in accordance with the outputs of the divider devices 83 and 85. In any position of the alignment switch 261, the frequencies of the voltages-to-ground present on the conductors 263 and 265 are in the ratio of 1:6. If one of these sources to ground is applied to the vertical deflecting plates of an oscilloscope and the remaining voltage-to-ground is applied to the horizontal deflecting plates of the oscilloscope, a Lissajous figure is formed having 6 nodes or lobes. If the figure on the screen of the oscilloscope does not show such a configuration, the correct 6:1 ratio is not present and the appropriate adjustable resistor 119 is adjusted until the Lissajous figure indicates that the correct ratio of frequencies is present.

By proper manipulation, the range scope may be employed as an oscilloscope for comparing the frequencies applied thereto from the conductors 263 and 265. This manipulation is discussed in detail below.

Summarizing the operation of the synchronizer illustrated in Fig. 6, the conductors 203 and 207 provide a series of fixed pulses of accurate formation and accurately timed spacing. The conductor 259 provides a series of accurate movable pulses which may be adjusted in phase with respect to the fixed pulses by manipulation of the knob 251. The phase relationship existing between the fixed and movable pulses or a quantity represented by such phase relationship may be depicted on the register 27.

An oscillation is applied to the conductor 177 having a period of repetition corresponding to a range of 5000 yards between an observation station and an object to be located.

The conductors 263 and 265 may be connected between the oscillation generators of the synchronizer and an oscilloscope for the purpose of comparing the ratio of frequencies of pairs of the oscillation generators.

*The transmitter*

The transmitter is designed to produce a series of pulses of electromagnetic radiation which are timed by the fixed pulses obtained from the synchronizer. The transmitter includes a source of high-frequency oscillations, such as a magnetron oscillator, and a modulator or pulser for controlling the output of the magnetron oscillator.

As shown in Fig. 8, the transmitter includes the magnetron 63 which conveniently may be of the resonant-cavity type. This magnetron has a grounded anode and is coupled by means of a probe 63a to a wave guide 63b. The wave guide 63b projects into the parabola 45 and has a plurality of antennae 63c and 63d substantially at the focal point of the parabola 45. The antennae 63c are in the form of radiating dipoles, whereas the antennae 63d are in the form of parasitic or reflecting dipoles which assist in directing radiation towards the parabola 45. From the parabola the radiation is redirected in a highly directional path towards an object to be located or into an area to be scanned.

As is well understood in the art, a magnetic field must be provided for the magnetron. The field is produced in Fig. 8 by field windings 63e which are energized through a full-wave rectifier 63f from the secondary of an auto-transformer 63g. This auto-transformer may be of the adjustable type for varying the current supplied to the winding 63e. As illustrated in Fig. 8, the primary of the auto-transformer is connected for energization at a suitable voltage, such as 115 volts, from a pair of conductors 319 and 321.

Returning to the magnetron it will be observed that the magnetron is provided with a filament having two conductors 294 and 296 connected thereto. To force the magnetron into oscillation, high-voltage pulses which may be of the order of 10,000 volts are applied between the filament and the anode.

It has been found that a magnetron of this type operates most efficiently when the voltage applied between its filament and its anode is in the form of substantially rectangular pulses. In order to obtain such pulses, the magnetron is energized through a normally charged condenser 298 (Fig. 7) which has its negative terminal connected to the conductor 296, from a modulator or pulser which now will be described.

Referring to Fig. 7, a modulator is disclosed which is controlled by fixed pulses obtained from the synchronizer through the conductor 203. The fixed pulses are applied by the conductor 203 to the input grid of a multivibrator 301. This multivibrator again preferably is of the cathode-coupled type. The purpose of the multivibrator is to generate a rectangular pulse for each fixed pulse applied to the input grid thereof. The multivibrator comprises two pentode tubes 303 and 305 which are coupled through a common cathode resistor 307. The input pulse establishes a voltage across the grid resistor 309 which has a condenser thereacross (this condenser provides a suitable terminating impedance for the conductor 203, which may be part of a coaxial cable). The plate voltage for the tubes 303 and 305 is obtained through suitable plate resistors from a conductor 311 which is connected to the output terminal of a filter 313. This filter is energized from a full-wave rectifier 315. The plate supply for the full-wave rectifier is obtained through a conventional transformer 317 having a primary energized by alternating current of a suitable voltage such as 115 volts. The alternating current may be supplied from the conductors 319 and 321. The voltage output of the full-wave rectifier 315 is dependent upon the requirements of the types of tubes to which plate voltage is to be supplied, and may, for example, be of the order of 300 volts.

The bias on the grid of the tube 305 is determined by a voltage divider 323 which is adjustable for the purpose of adjusting the bias on the grid. As illustrated in Fig. 7, this divider comprises resistors connected between the conductor 311 and ground. Bias for the grid of the tube 305 is obtained from an adjustable tap 325 through a grid resistor 327. The bias on the grid of the tube 305 is adjusted by manipulation of the tap 325 to permit only one cycle of operation of the multivibrator for each fixed pulse applied to the control grid of the tube 303. In other words, the multivibrator 301 is adjusted to operate as a trigger circuit which is triggered once for each fixed pulse.

The output of the multivibrator 301 is coupled through a condenser 329 to the control grid of a pentode amplifier tube 331 and to the grid resistor associated with this tube. The voltages for the plate and screen grid of the tube 331 may be derived from the conductor 311.

The output of the amplifier tube 331 is coupled to an amplifier tube 333 by a cathode-follower coupling. In the conventional cathode-follower circuit, the driving tube must supply not only the required driving voltage for the succeeding tube but in addition thereto must supply a voltage equal to the voltage drop across the cathode-resistor of the succeeding tube. In order to avoid the difficulties resulting from the conventional cathode-follower coupling, a cathode coupling of the type illustrated in Fig. 7 is employed. In this coupling, the cathode of the amplifier tube 331 is connected to ground through a series circuit which includes two windings 335 and 337 which are mutually coupled with extremely close coupling. The series circuit also includes a resistor 339. The resistor 339 is connected across the control grid and cathode of the tube 333, through a grid resistor 341 and a coupling condenser 343.

In a somewhat similar manner, the cathode of the amplifier tube 333 is connected to ground through a series circuit which includes two mutually-coupled windings 345 and 347 which correspond to the windings 335 and 337, a resistor 349 and a biasing resistor 351 across which a condenser 353 is connected. The voltage across the resistor 349 is applied between the grids and cathode of an amplifier tube 355, through coupling condensers 357 and 357' and grid resistors 359 and 359'. Although the tube 355 has two sets of grids and two sets of plates, they are effectively connected in parallel. The plates of this tube may be energized together with the plate of the tube 333, through a plate resistor, from the conductor 311.

Returning now to a consideration of the operation of the mutually-coupled windings 335 and 337, current flows from the cathode of the tube 331, through the windings 335 and 337 in such directions as to produce oppositely directed magnetomotive forces in the associated core. For this reason the windings offer very little impedance to the flow of such current. The current flowing through the resistor 339 produces a voltage thereacross. The control grid and cathode of the tube 333 are connected through the resistor 341 and the condenser 343 across the resistor 339 for energization in accordance with the voltage thereacross.

The tube 333, in turn produces a current in its plate circuit which in flowing through the circuit connecting the cathode to ground raises the voltage of the cathode to a substantial value above ground. However, the alternating voltage between the cathode of the tube 333 and ground also is across the series circuit including the coupling condenser 343 and the winding 337. A current flows, therefore, in the winding 337, and this current induces a voltage in the winding 335. The direction of the voltage induced in the winding 335 is such as to compensate the series circuit including the windings 335 and 337 for the voltage drop across the winding 337 which is produced by current supplied from the cathode of the tube 333. For this reason, the tube 331, despite the rise in voltage of the cathode of the tube 333 above ground, need supply a voltage which is substantially no larger than the voltage across the resistor 339. In other words, the rise in voltage of the cathode of the tube 333 with respect to ground no longer necessitates an equal rise in the voltage output of the tube 331. The operation of the tube 333 in supplying a signal voltage to the tube 355 is substantially similar to the operation of the tube 331 with respect to the tube 333. For this reason, a further discussion of the coupling between the tubes 333 and 355 is believed to be unnecessary. A coupling of the foregoing type is disclosed in the McClelland application, Serial No. 453,788, filed August 6, 1942, which has issued as Patent 2,379,168.

It will be noted that the screen grid of the tube 333 is bypassed through the condenser 361 to the cathode of the tube 333 rather than to ground. This permits the voltage of the screen grid with respect to the cathode to remain substantially constant despite a variation in the voltage of the cathode with respect to ground. This "floating" operation of the screen grid of the tube 333 increases the stability of the operation of this tube.

One of the advantages of cathode coupling between the stages of the modulator is that the signal is not inverted between the successive stages. For this reason, the tubes may be adjusted to carry no current except when a fixed pulse triggers the multivibrator 301. Since the tubes may be required to pass several amperes of current during the pulse, losses are materially reduced by restricting current flow to the short time determined by the fixed pulse, and the average current of the tubes may be materially decreased. A somewhat similar tube operation may be obtained by employing transformer coupling between the stages of the modulator for the purpose of reinverting the signal but such transformers have substantial capacitive losses. For these additional reasons, the cathode-follower coupling illustrated in Fig. 7 is preferred.

It should be observed that the screen grid of the tube 355 is coupled by the condenser 363 to the cathode of the tube 355. This is for the reason explained with reference to tube 333.

The tube 355 is designed to operate normally cut off and with a substantial voltage between its plates and its cathode. Part of this voltage is derived by raising the plates of the tube 355 above ground by connecting the plates to the conductor 311 through a suitable decoupling resistor. The remainder of the required voltage is obtained by lowering the cathode of the tube 355 to a substantial voltage below ground. As specific examples of suitable values for commercially available tubes, the plates of the tube 355 may be raised to a voltage between 200 and 300 volts above ground. The cathode of the tube 355 may be connected through a conductor 365, an inductance choke 367 and a resistor 369 to a conductor 371 which is maintained at a voltage of the order of —2000 volts with respect to ground. It will be observed that the control grids of the tube 355 are connected to the conductor 371 through a resistor 373 for the purpose of properly biasing the grids. Suitable voltage for the screen grid of the tube 355 is derived from a voltage divider having resistors 375 and 377 connected between the conductor 371 and ground through a screen grid resistor.

When a signal is applied to the control grids of the tube 355 to render the tube conductive, a voltage of the order of 2000 volts is available between the conductor 371 and the cathode of the tube 355 across the choke 367 and resistor 369. This voltage is applied between the control grid and cathode of a tube 381 by a circuit which may be traced from the conductor 371, through the resistor 377, a conductor 383, the cathode of the tube 381, the control grid of the tube 381 and a grid resistor 385 to the cathode of the tube 355.

It will be recalled that the negative terminal of the condenser 298 is connected to the filament of the magnetron 63 through the conductor 296. This condenser is normally charged to a high voltage such as 11,500 volts. When the tube 381 becomes conductive it effectively connects the positive terminal of the condenser 298 through the condenser F1, which is in parallel with the resistor 375, to ground. If the drop across the tube and across condenser F1 is of the order of 1,500 volts, the completion of the condenser circuit through the tube 381 applies approximately 10,000 volts between the filament and anode of the magnetron. The rectangular pulses produced by the modulator in response to the triggering action of the fixed pulses may have a duration of approximately one microsecond and may have a frequency of repetition of 911 pulses per second.

The filament of the magnetron is energized through the two conductors 294 and 296. These conductors are connected to the secondary winding of a filament transformer 401. The primary of the filament transformer is connected to a suitable source of alternating-current energy such as that represented by the conductors 319 and 321. It is desirable that the current supplied to the filament of the magnetron have a substantially constant value. For this reason, a condenser 403 may be connected in series with the primary winding of the filament transformer 401. This condenser cooperates with the transformer to provide a substantially constant current for the filament of the magnetron.

In operation, the anode of the magnetron is grounded and the filament has a voltage-to-ground which varies over a range of approximately 10,000 volts. If the filament is connected directly to the transformer 401, the transformer must be insulated to withstand the aforesaid variation of voltage-to-ground. It would also be necessary to reduce the capacity to ground of the secondary winding of the transformer 401 to an extremely low value. Such requirements would increase the size, weight and cost of the transformer.

To reduce the requirements for the transformer 401, a choke 405 is inserted between the secondary winding of the transformer 401 and the conductors 294 and 296. This choke includes two windings 407 and 409 which have close mutual coupling. One of the windings 407 is connected between the conductor 294 and the transformer 401, whereas the remaining winding 409 is connected between the conductor 296 and the transformer. The windings are so arranged that current supplied by the transformer 401 when flowing through the two windings produces opposed magnetomotive forces in the core of the choke. For this reason, the choke 405 offers very little impedance to the flow of filament current from the transformer 401.

However, when the voltage of the filament of the magnetron is suddenly varied with respect to ground, current tends to flow from the filament through the two windings 407 and 409 in parallel. Such currents produce magnetomotive forces which are in the same direction in the core of the choke. Consequently, the choke 405 offers a high impedance to the initiation of flow of such currents and the voltage-drop-to-ground appears across the choke. For this reason, the filament transformer 401 need not be insulated to withstand the voltage between the filament of the magnetron and ground and need not be of a low-capacitance type.

In order to maintain the condenser 298 normally energized a high-voltage rectifier is provided which may be in the form of a voltage doubler 411. This voltage doubler includes two rectifier tubes 413 and 415 which are connected to charge two condensers 417 and 419 with polarities indicated by conventional (+) and (—) polarity markings in Fig. 7. Since the filaments of the rectifier tubes have a substantial voltage therebetween, these filaments are energized from two insulated secondary windings of a transformer 421. The primary of this transformer is energized from any suitable source, such as that represented by the conductors 319 and 321.

Plate voltage for the rectifier tubes is obtained through a transformer 423 which has one terminal of its secondary winding connected to the filament of the rectifier tube 413 and to the plate of the rectifier tube 415. The remaining terminal of the secondary winding is connected to the common terminal of the two condensers 417 and 419. The primary of the transformer is connected to a suitable source of alternating current such as that represented by the conductor 319 and a conductor 425. This source may be adjustable for the purpose of adjusting the direct-current output voltage of the voltage doubler.

The negative output terminal of the voltage doubler 411 is connected through a resistor 427 to a conductor 429. Referring to Fig. 12, this conductor 429 is connected through the solenoid 431 of an overcurrent relay 973 to ground.

Returning to Fig. 7, it will be observed that the positive output terminal of the voltage doubler is connected through a choke coil 435 to the positive terminal of the condenser 298. The charging circuit for the condenser 298 is completed by a ground connection 437 for one terminal of the secondary winding of the transformer 401. Since the condenser 298 is connected across the terminals of the voltage doubler 411, it is maintained in a normally-energized condition.

Although the magnetron 63 (Fig. 8) may require replacement or servicing, the mountings heretofore provided have rendered such servicing or replacement difficult. A construction facilitating servicing and replacement is illustrated in Fig. 9. As shown in Fig. 9, the magnetron 63 is provided with a housing 441 having flanges to assist in dissipatng heat from the housing. The magnetron 63 is coupled to the wave guide 63b. By inspection of Fig. 9, it will be observed that the wave guide 63b has a separable portion 443 which is connected to the remainder of the wave guide through a choke coupling having separable parts 445 and 447. One of these parts has a continuous groove 449 providing a quarter wave length path for radiation of the frequency transmitted by the wave guide. Since such a coupling offers a high impedance to the escape of radiation from the wave guide, it is unnecessary to secure the parts of the coupling to each other. For this reason, the portion 443 of the wave guide may be removed as a unit with the magnetron 63 without disturbing the remainder of the wave guide.

The magnetron 63 has a pair of filament terminals 451 projecting therefrom. These terminals are of the plug type and are received in sockets 453 which are insulated from each other and are mounted on a suitable base 455. The magnetron 63 also has a flange 457 provided with one or more openings through which pins 459 project. These pins have circular grooves at their free ends for detachably receiving spring clips 461. The clips 461 may be removed from the pins to permit withdrawal of the magnetron 63 from the base.

Two field windings 63e are shown positioned on opposite sides of the magnetron. These field windings surround magnetic cores 463 which terminate in pole faces adjacent the magnetron 63. The magnetic cores 463 are secured to arms 465. The arms are connected by means of a rod 467. The arms 465 and the rod 467 may be formed of magnetically soft iron or steel to complete a magnetic path for the magnetic flux supplied to the magnetron 63. If desired, the rod 467 may carry a support 469 for a blower (not shown). A blower is desirable for directing cooling air on the fins of the housing 441.

It will be observed that the magnetic structure employed for directing magnetic flux into the magnetron substantially surrounds the magnetron. To facilitate removal of the magnetron the arms 465 are pivotally mounted on pins 471. The arms are retained in the position indicated by means of a latch 473. When the latch 473 is lifted out of the path of the arms 465, the arms may be rotated to the position indicated in dotted lines in Fig. 9, whereby the magnetic structure is substantially displaced from the magnetron. This position may be determined by the engagement of a stop pin 475 with a stop abutment 477 which is secured to one of the arms 465 by means of a strap 479.

By movement of the arms 465 and associated magnetic structure to the positions indicated in dotted lines and by removal of the spring clips 461, the magnetron and the portion 443 of the wave guide may be removed as a unit and replaced by a substitute unit. Since the magnetron 63 is permanently associated with the portion 443 of the wave guide, this portion may be tuned to the associated magnetron at the factory.

*The receiver*

When pulses radiated from the parabola 45 strike an object, reflections or echoes are set up which are radiated towards the receiving parabola 47 (Fig. 8). The receiving parabola has associated therewith radiating (or radiation receiving) dipoles 481 and reflector dipoles 483 which direct radiation received by the parabola into a wave guide 485. The dipoles 481 and 483 and the wave guide 485 may be similar, respectively, to the dipoles 63c and 63b and the wave guide 63b associated with the transmitting parabola.

In the wave guide 485 radiation received from the dipoles is mixed with the output of a suitable local oscillator 487. This local oscillator conveniently may be a velocity-modulated oscillator, such as the "reflex klystron" type. The local oscillator comprises a cavity resonator 489, a reflector 491 and a cathode 493. The cavity resonator is grounded and has a coupling loop 495 associated therewith for directing radiation into the wave guide 485 through a coaxial line 497.

Energization for the local oscillator may be derived from a voltage divider 499 having its positive terminal grounded. The cathode is connected to the voltage divider through conductors 501 and 503 to maintain the cathode at a negative voltage with respect to the grounded cavity resonator. The reflector 491 is connected through a conductor 505 to the voltage divider to maintain the reflector at a negative voltage with respect to both the cavity resonator 489 and the cathode 493. It will be observed that adjustable resistors 507 provide coarse and fine adjustments for the voltage of the cathode 493 with respect to the cavity resonator. In an analogous manner, adjustable resistors 509 provide coarse and fine adjustments for the voltage of the reflector with respect to the cathode. The voltage divider is supplied with electrical energy through conductors 511, 513, 515 and 517 in a manner to be described below.

In the wave guide 485, radiation from the receiving dipoles and from the local oscillator are mixed to provide a beat frequency which may be of the order of 30 megacycles per second. This beat frequency is picked up by a crystal detector 519 and the output of the detector is transmitted through a coaxial cable 521 to a preamplifier 523. Preferably, the preamplifier is located as close to the crystal detector as possible.

Two stages are provided in the preamplifier as represented by the pentode tubes 525 and 527. These tubes are coupled to the crystal detector, to each other and to output conductors through suitable coupling transformers 529, 531 and 533. Plate voltage for the pentode tubes 527 and 525 is derived from a conductor 535 through a dropping resistor 537 with which a voltage regulator tube 539 cooperates to regulate the voltage supplied to the tubes. Since the preamplifier is otherwise of substantially conventional construction, it is believed that a further discussion thereof is unnecessary. The output of the preamplifier is coupled through a coaxial cable 541, a coupling transformer 543 and four stages of intermediate frequency amplification represented by pentode tubes 545, 547, 549 and 551 to a diode detector 553. The tubes of the intermediate frequency amplifier preferably are coupled to each other by means of a semi-link coupling 555. The semi-link coupling includes a pair of tunable inductances 557 and 559 which have substantially no mutual coupling. Substantially the only coupling between the stages is that produced by a link coil 561 connected in series with the inductance 559. The small link coil 561 is mutually coupled to the coil 557. It will be observed that the inductance 557 is located in the plate circuit of a preceding pentode tube, whereas the inductance 559 is in the control grid circuit of the succeeding tube. Because of this construction, either of the inductances may be tuned without materially affecting the tuning of the other of the inductances. Since the intermediate frequency amplifier otherwise is of substantially conventional construction, further description appears unnecessary.

The output of the intermediate frequency amplifier passes through the diode detector 553 and is applied to the first pentode tube 563 of a video amplifier. The output of the tube 563 is amplified in two succeeding stages represented by the pentode tubes 565 and 567. The output of the entire receiver is applied between a conductor 569 and ground.

It will be observed that the two parabolas 45 and 47 are located adjacent each other. Although it is desirable that the receiving parabola 47 receive energy only from reflection or echo pulses, in practice it is difficult to avoid the reception of transmitted pulses directly from the transmitting parabola 45. If the received signal representing radiation received directly by the receiving parabola from the transmitting parabola is dissipated prior to the arrival at the receiving parabola of a reflection or echo pulse, the system operates properly. However, since the directly received radiation may have an amplitude substantially greater than that of the reflection or echo pulse, the receiver preferably should be so designed that the directly received radiation cannot paralyze or block operation of the receiver for a time sufficient to prevent reception of the reflection or echo pulse. As a specific example of trouble resulting from the strong radiation received directly by the receiving parabola from the transmitting parabola, reference may be made to the coupling condensers 570 in the video amplifier. These condensers may receive a large charge which requires substantial time before it can be discharged through the associated grid leak. If the time constant of a coupling condenser which is so charged and its associated grid leak is such that the condenser is not discharged prior to the arrival of the reflection or echo pulse, the system does not operate properly.

To prevent such blocking or paralysis of the receiver, the pentode tube 563 may be operated at a nearly saturated level. Such operation may be obtained by employing an extremely low plate voltage for the tube 563. Although such operation results in a low output from the tube, it effectively prevents blocking or paralysis of the succeeding stages of the video amplifier. The remainder of the video amplifier is of substantially conventional construction and requires no further discussion. It will be observed that the output to the conductor 569 is derived from the voltage across the cathode resistor 572 of the final tube 567.

The gain of the receiver may be adjustable in any suitable manner. As shown in Fig. 8, the plate voltage for the video amplifier and intermediate frequency stages is derived from a conductor 571. A voltage regulator tube 573 is provided for further regulating the plate voltage applied to the intermediate frequency stages. It will be observed that the voltage for the intermediate frequency stages is obtained from a potentiometer 575 having an adjustable tap 577. This potentiometer is associated with a fixed resistor 579 for varying the plate and screen grid voltage supplied to the intermediate frequency stages. Consequently, adjustment of the tap 577 serves to adjust the gain of the receiver.

*Range scope*

The range scope is employed for comparing the reflection or echo pulses received and amplified by the receiver with the movable pulses generated by the synchronizer and for assisting in establishing a predetermined relationship therebetween. Referring, briefly, to Fig. 3, it will be recalled that the movable pulse derived from the synchronizer is employed for initiating a trace on the range scope 19 having a vertical break 25 therein. The output from the receiver is applied to the vertical plates of the range scope to produce the pulse 5 which corresponds to the reflection or echo pulse received from an object to be located. By adjustment of the phase of the movable pulse with respect to the pulse transmitted towards the object to be located, the time of initiation of the horizontal trace of the range scope is adjusted until the vertical break 25 is adjacent the leading edge of the pulse 5. The relationship between the vertical break and the pulse 5 determines accurately the range from the object to the observation station and the range is read from the register 27.

As shown in Fig. 10, the movable pulse from the synchronizer is applied through the conductor 259 and a coupling condenser 591 to the input grid of a multivibrator 593. This multivibrator preferably is of the cathode-coupled type previously described. The bias of the grid of the second section of the dual triode tube employed for the multivibrator is controlled by the adjustable tap 595 of a potentiometer 597. The potentiometer is connected between ground and a conductor 599 which is maintained at a negative voltage with respect to ground, which voltage may be of the order of —100 volts. The movable tap 595 is so adjusted that the multivibrator 593 does not break into sustained oscillation. For each movable pulse applied thereto, the multivibrator, by reason of its bias adjustment, passes through one cycle to produce a rectangular output pulse. In other words, the multivibrator operates as a trigger circuit which is triggered by the movable pulse supplied by the conductor 259. The multivibrator may be designed to provide a negative output pulse having a duration of the order of 15 microseconds.

The output of the multivibrator is coupled through a condenser 601 to the grid of an amplifier tube 603. The tube 603 obtains its plate current through a suitable choke 605 from a conductor 607 which is maintained at a positive voltage with respect to ground. The conductor 607 may be employed for supplying plate current to the plates of the multivibrator 593 through suitable plate resistors.

The output of the tube 603 is applied through one pole of a double-pole switch 609, a conductor 611 and a coupling condenser 613 to one of the horizontal plates 615 of the range scope 19. The remaining horizontal plate 617 is connected to ground through a conductor 619 and resistors 621 and 623.

The tube 603 normally conducts current. When a rectangular pulse is applied to the control grid 603 from the multivibrator 593, the pulse biases the control grid of the tube 603 negative with respect to the associated cathode to stop the flow of plate current through the tube. At a result of the stoppage of plate current, the voltage of the plate of the tube 603 rises rapidly with respect to ground and serves to increase the charge of a condenser 604 which is connected between the plate of the tube 603 and ground. Since the voltage across the condenser 604 is applied effectively across the horizontal plates of the range scope 19, the increase in voltage across the condenser 604 produces a horizontal sweep of the electron beam in the range scope.

Direct current for energizing the range scope 19 may be derived in part from a full-wave rectifier 625. The output from this rectifier passed through a filter 627. The positive terminal of the rectifier is connected to ground and the negative terminal is connected through the filter choke and a resistor 629 to a conductor 631. The conductor may be maintained, for example, at a negative voltage of —2000 volts with respect to ground. The output of the rectifier 625 is connected across a voltage divider which may be traced from the conductor 631 through the resistors 633 and 635 in parallel, a resistor 637, a conductor 639, a resistor 641 and three paths in parallel to ground. These paths, respectively, comprise a first path including resistors 643 and 645, a second path including resistors 647 and 623, and a third path including resistors 649 and 651. It will be observed that the horizontal plate 615 is connected through a resistor 653 and one pole of a double-pole switch 655 to an adjustable tap 657 on the resistor 643. Adjustment of the tap 657 serves to center horizontally the electron beam in the range scope.

The range scope 19 has its electrodes connected to the voltage divider for the purpose of controlling the electron beam therein. The conductor 631 is connected through a resistor 659 to the control electrode 661, whereas the cathode 663 of the range scope is connected to the voltage divider by means of an adjustable tap 665. With this connection the cathode is maintained at a positive voltage with respect to the control electrode 661. Consequently, the control electrode prevents electrons from reaching the screen of the range scope.

The cathode 663 periodically is given a less positive voltage with respect to the control electrode 661 for the purpose of permitting electrons from the cathode to reach the screen of the range scope. This is effected by coupling a portion of the output of the multivibrator 593 through a conductor 666 and a coupling condenser 667 to the cathode 663. When the multivibrator 593 is triggered to produce a rectangular output pulse, a portion of the output is applied to the cathode 663 of the range scope to provide an "unblanking" pulse for the range scope. This pulse lowers the cathode to a sufficiently less positive voltage with respect to the control electrode to permit electrons to reach the screen of the range scope. It should be noted that the unblanking pulse is applied to the range scope by the same multivibrator which controls the horizontal sweep of the trace in the range scope. For this reason, the electron beam is effective in forming a trace on the screen only in one direction of travel of the electron beam which may be termed the "forward" direction. By adjustment of the movable tap 665, the intensity of the electron beam may be adjusted.

An accelerator electrode 669 is connected to the voltage divider by means of an adjustable tap 671. This electrode is at a positive voltage with respect to the cathode and serves to focus the electron beam in response to adjustment of the movable tap 671. An additional control electrode 673 is connected through the conductor 599 to a source of voltage to maintain this electrode somewhat negative with respect to ground although positive with respect to the control electrode or grid, cathode, and focusing electrode.

The conductor 259 also is coupled through a condenser 675 to the input grid of a multivibrator 677 to apply thereto the movable pulses obtained from the synchronizer. The multivibrator 677 may be substantially similar, in general construction, to the multivibrator 593. The adjustment of the multivibrator 677 is controlled by an adjustable resistor 679 which controls the bias of the grid of the second section of the multivibrator tube. It will be understood that the multivibrator 677 is so adjusted that it will not sustain oscillation. When properly adjusted the multivibrator breaks down for one cycle of operation in response to the application thereto of each pulse through the coupling condenser 675. By adjustment of the adjustable resistor 679, the width of the rectangular pulse produced by the multivibrator 677 may be controlled within a certain range for a purpose hereinafter described.

The output of the multivibrator 677 is coupled through a condenser 681 to the control grid of a triode amplifier tube 683 which may provide an amplifier stage of conventional structure. A portion of the output of the tube 683 is coupled through the cathode resistor 684 of this tube to a conductor 685. This conductor extends to the P. P. I. scope for the purpose of controlling the production therein of a movable range ring in a manner described below.

The output of the tube 683 also is coupled through a condenser 693 and a grid resistor 694 to the grid of a pentode amplifier tube 695. It will be observed that the grid of the tube 695 is biased suitably through a resistor 696, a conductor 697 and a suitable resistor 701 from a voltage divider comprising resistors 699, 733a, 733b, 733c associated with the conductor 599 which is maintained at a negative voltage with respect to ground. The plate supplies for the plates of the multivibrator 677 and the tube 683 may be obtained through suitable plate resistors and a dropping resistor 703 from the conductor 607 which is maintained at a positive voltage with respect to ground. A suitable regulator tube 705 may be associated with the dropping resistor 703 for the purpose of regulating the plate voltage supplied to the multivibrator and the tube 683. Plate and screen grid voltages for the pentode tube 695 may be derived through suitable plate and screen grid resistors from the conductor 607.

The output of the tube 695 is coupled through a conductor 707, one pole of a three pole switch 709, a conductor 711 and a coupling condenser 713 to a vertical plate 715 of the range scope 19. The remaining vertical plate 717 is connected through a conductor 719, a resistor 721 and the resistor 623 to ground. From this discussion, it will be clear that the vertical deflection of the trace in the range scope 19 is controlled in part by the output of the tube 695. The direct voltage across the vertical plates may be adjusted for the purpose of varying the vertical position of the trace in the range scope 19 by operation of a movable tap 723 which is associated with the resistor 651 and which is connected through a suitable resistor 725 to the plate 715. It will be recalled that the resistor 651 is part of a voltage divider.

Returning to the multivibrator 677, this multivibrator is designed to produce a rectangular output pulse of approximately 6 microseconds' duration. This rectangular pulse is applied to the vertical plates of the range scope 19 for the purpose of producing in the trace of the range scope a vertical break.

Referring again to Fig. 3, the dash line H represents the trace on the screen of the range scope when the vertical plates have no deflecting voltage applied thereto. The effect of the rectangular pulse produced by the multivibrator 677 of Fig. 10 is to deflect vertically the trace on the screen of the range scope by a distance D for a time in each horizontal sweep of approximately 6 microseconds. At the end of this time, the trace drops abruptly to the line H to produce the vertical break 25. The vertical break 25 may be adjusted with respect to the point of initiation of the horizontal trace to some extent by adjustment of the adjustable resistor 679 (Fig. 10). The purpose of this adjustment is to permit the vertical break to be set in a zero position during calibration of the range scope. This calibration will be discussed below.

Reflection or echo pulses after detection and amplification are applied through the conductor 569 and a coupling condenser 731 to the control grid of an amplifier pentode tube 733. The grid of this tube may be biased suitably through a resistor 734 from a voltage divider which includes the resistors 699, 733a, 733b and 733c connected between the conductor 599 and ground. The output of the pentode tube 733 is coupled through a condenser 735 to the control grid of an additional pentode amplifier tube 737. The grid of the tube 737 may be biased suitably through a resistor 739 from the voltage divider formed by the resistors 699, 733a, 733b and 733c.

The plate of the tube 737 is connected through a conductor 740 and the conductor 707 to the plate of the tube 695. Consequently, the outputs of both the tube 737 and the tube 695 are applied through one pole of the switch 709, the conductor 711 and the coupling condenser 713 across the vertical plates of the range scope 19.

The output of the tube 737 applies to the screen of the range scope 19 the pulse 5 which is illustrated in Fig. 3. It will be understood that the pulse 5 corresponds to the reflection or echo pulse obtained from an object to be located. When the pulse 5 is properly related to the vertical break 25, as illustrated in Fig. 3, the range of the object to be located appears on the register 27.

In the discussion of the synchronizer illustrated in Fig. 6, it was pointed out that by connecting the conductors 263 and 265 to an oscilloscope, the multivibrators 81, 83 and 85 may be adjusted properly. By the provision of suitable control circuits, the conductors 263 and 265 may be connected to the range scope 19 of Fig. 10, which then serves as the desired oscilloscope for indicating the adjustment of the multivibrators in the synchronizer.

Referring to Fig. 10, it will be observed that the conductor 263 is connected through a coupling condenser 741 and grid resistor 742 to the control grid of one section of a dual triode amplifier tube 743. The output of this section is coupled through a coupling condenser 744 and grid resistor 746 to the control grid of one section of a second dual triode amplifier tube 745. The output of the latter section is connected through a conductor 747 to one pole of the three-pole switch 709. When the switch 709 is actuated to the right, as viewed in Fig. 10, the conductor 747 is connected through the conductor 711 and the condenser 713 to the vertical plate 715 of the range scope.

In a somewhat analogous manner, the conductor 265 is connected through a coupling condenser 749 and grid resistor 750 to the control grid of a second section of the tube 743. The output of the last-named section of the tube 743 is coupled through a coupling condenser 751 and a grid resistor 752 to the control grid of the second section of the tube 745. The output of the second section of the tube 745 is connected through a conductor 753 to the middle pole of the three-pole switch 709. When the switch 709 is actuated towards the right, as viewed in Fig. 10, the conductor 753 is connected through the conductor 611 and the coupling condenser 613 to the horizontal plate 615 of the range scope. From this discussion, it will be understood that the tubes 743 and 745 provide two stages of amplification for the signals supplied from the conductors 263 and 265 and correspond to the vertical and horizontal amplifiers conventionally employed in cathode-ray oscilloscopes. The plates of the tubes 743 and 745, together with the plate of the tube 733 may be connected through suitable resistors and a conductor 755 to the conductor 607 which is maintained at a positive voltage with respect to ground.

The three-pole switch 709, the two-pole switch 655 and the two-pole switch 609 preferably are arranged for simultaneous operation. As will be understood from the foregoing discussion, the switches in the positions indicated in Fig. 10 connect the range scope 19 for utilization in measuring the range of an object to be located. When the switches 709, 655 and 609 are actuated to their remaining positions, the range scope 19 is connected for operation as a conventional cathode-ray oscilloscope for comparing the frequencies of the outputs of the oscillator and multivibrators in the synchronizer of Fig. 6. As previously explained, operation of the switch 709 to the right, as viewed in Fig. 10, connects the vertical and horizontal plates of the range scope for energization in accordance with the outputs of two of the oscillation generators in the synchronizer. At the same time, actuation of the switch 655 disconnects the horizontal centering adjustment of the range scope and connects the horizontal plate 615 to a terminal 757 for applying to the horizontal plates a predetermined centering voltage. In addition, simultaneous operation of the switch 609 disconnects the output of the tube 603 from the horizontal plate circuit of the range scope and establishes a short circuit between the condenser 601 and ground to eliminate the unblanking pulse normally furnished by the multivibrator 593 to the range scope 19. After such actuation of the switches the range scope may be used as an ordinary oscillograph to compare the frequencies of the oscillation generators in the synchronizer of Fig. 6. It will be recalled that manipulation of the alignment switch 261 shown in Fig. 6 connects different pairs of the oscillation generators to the conductors 263 and 265. The Lissajou figure for each of these pairs may be inspected on the range scope for the purpose of adjusting the ratio of frequencies for each pair to its proper value. The intensity and focusing controls of the range scope are adjusted to make the Lissajou figures clearly visible.

*The P. P. I. scope*

The P. P. I. scope 29 is employed to present, in effect, a polar map on which the positions of objects to be located are shown in both range and direction. The P. P. I. scope is in substance similar to a cathode-ray oscilloscope having magnetic focusing and deflection coils.

In Fig. 11, the P. P. I. scope 29 has a focusing coil 756. A deflection coil 758 is mounted on a rotatable yoke or sleeve 759 for rotation about the axis of the P. P. I. scope. The rotation of the yoke 759 is determined by a position motor 761 which is geared to the yoke by suitable gearing 763. The position motor is designed to rotate the deflection coil 758 in synchronism with rotation of the direction of radiation from the transmitting antenna or parabola 45. Consequently, the direction of deflection of the electron beam in the P. P. I. scope always indicates the direction of radiation and the direction of objects in the path of such radiation. The operation of the position motor 761 will be discussed in greater detail below.

The P. P. I. scope 29 has a cathode 765, a control grid 767, a first anode 769 and a second anode 771. These electrodes are energized in part from a rectifier 773 having a filament energized from a secondary winding 775 of a transformer 777. An additional secondary winding 779 supplies plate voltage for the rectifier tube. The primary winding of the transformer 777 may be energized from any suitable source of alternating current such as that represented by the conductors 781 and 783. The output of the rectifier 773 is filtered suitably and the positive output terminal of the filter is connected to the anode 771 of the P. P. I. scope. The positive terminal also is connected through a resistor 785 to the first anode 769 and to a voltage divider comprising the resistors 787 and 789. The cathode 765 of the P. P. I. scope is connected between the resistors 787 and 789 to maintain the cathode at a positive voltage with respect to ground. This voltage may be varied by operation of an adjustable tap 791 associated with the resistors 789 in order to adjust the intensity of the electron beam in the P. P. I. scope.

The focusing coil 756 of the P. P. I. scope is energized from a potentiometer 793. This potentiometer is connected through an adjustable tap 797 between ground and the conductor 607 which is maintained at a positive voltage with respect to ground. One terminal of the coil 756 is connected to the conductor 607. The remaining terminal is connected through a conductor 795 to a fixed tap on the potentiometer 793. By manipulation of the adjustable tap 797, the current through the coil 756 may be adjusted to bring the electron beam within the P. P. I. scope into focus.

The deflection of the electron beam in the P. P. I. scope is controlled by the fixed pulse produced in the synchronizer. This fixed pulse is supplied through the conductor 207 and a coupling condenser 799 to a multivibrator 801. The multivibrator 801 again is of the cathode-coupled type, the cathode-coupling resistor being identified by the reference character 803. The grid of the second section of the multivibrator tube is biased from a potentiometer which includes two resistors 804 and 806 connected between ground and the conductor 599 which is maintained at a negative voltage with respect to ground. The resistor 806 has associated therewith an adjustable tap 808 for varying the bias on the grid of the second section of the multivibrator tube. This bias is so selected that the multivibrator tube does not support sustained oscillations. When properly adjusted, the multivibrator goes through one cycle of operation for each fixed pulse applied to its control grid to produce a rectangular output pulse.

The multivibrator 801 is coupled through its cathode resistor, a coupling condenser 809 and a resistor 810 to the control grid of an amplifier pentode tube 811. A portion of the output of the tube 811 is connected through a coupling condenser 813 to a second pentode amplifier tube 815. The plate of the tube 815 obtains voltage through a choke coil 817 and a resistor 819 from the potentiometer 793. The tube 815 normally carries current. When a rectangular pulse of proper polarity is applied to the control grid of the tube 815 from the multivibrator 801 and the amplifier tube 811, the tube 815 abruptly stops its passage of plate current for the duration of the pulse. In response to this cessation of plate current, the voltage of the plate with respect to ground rapidly increases. This increase in voltage is applied to the deflection coil 758 of the P. P. I. scope through a coupling condenser 821 and a conductor 823. A loading resistor 825 is connected across the deflection coil 758 for the purpose of controlling the rate of increase of current through the deflection coil. This increase is at a substantially linear rate and serves to move the electron beam across the face of the P. P. I. scope.

The electron beam normally is focused substantially in the center of the P. P. I. scope screen. The centering adjustment is provided by a voltage divider which may be traced from the potentiometer 793 through the resistor 819, a resistor 827, an adjustable resistor 829, a single pole, double-throw switch 831, a conductor 833 and the resistor 825 to ground. It will be observed that the deflection coil 758 is connected to its voltage divider at a point 835 intermediate the switch 831 and the resistor 825. Consequently, adjustment of the resistor 829 varies the direct current flowing through the deflection coil 758 for the purpose of centering the electron beam. In order to vary the rate of deflection of the electron beam, the resistance loading of the deflection coil 758 may be varied by operation of the switch 831. Operation of this switch from its terminal 837 into engagement with its terminal 839 decreases the resistance load across the coil 758 by introducing the resistor 841 thereacross. This serves to decrease the rate of deflection of the electron beam. At the same time, operation of the switch 831 introduces a resistor 843 in the voltage divider employed for centering purposes to maintain the center position of the electron beam.

The intensity of the electron beam in the P. P. I. scope is adjusted by manipulation of the movable tap 791 to a value such that the electron beam normally is not visible on the screen of the P. P. I. scope. Signals then applied to the control electrode 767 are employed for producing a bright trace on the screen.

The control grid 767 of the P. P. I. scope is subject to four distinct controls. One of these controls provides an "unblanking" pulse for bringing the electron beam intensity in the P. P. I. scope to a level which is just visible, or just below visibility, on the screen of the P. P. I. scope. This unblanking pulse is for the purpose of permitting an indication on the screen of the P. P. I. scope to be effected in only one direction of deflection of the electron beam, which is the direction away from the center of the screen.

A second control is responsive to the reflection or echo pulse which is received from an object to be located. This control raises the intensity of the electron beam and produces a bright dot on the screen of the P. P. I. scope for each object producing reflection or echo pulses.

A third control is for the purpose of placing on the screen of the P. P. I. scope a series of fixed range markers for indicating the range of an object to be located.

The fourth control is for the purpose of placing on the screen of the P. P. I. scope a movable range marker for indicating more clearly the range of the object to be located and to facilitate operation of the range scope.

Taking up these controls in the above order, the unblanking pulse is derived from the output of the amplifier tube 811. It will be recalled that this output is in the form of a rectangular pulse produced by the multivibrator 801.

The tube 811 is coupled by its cathode resistor 851 to a first section of a dual triode amplifier tube 853. This coupling is effected through a conductor 855 and a coupling condenser 857. Consequently, the plate current flowing in the first section of the tube 853 is controlled by the rectangular pulse output of the tube 811.

As previously pointed out, reflection or echo pulses received from objects to be located are detected and amplified. The amplified pulses are supplied through the conductor 569, a conductor 859, a coupling network 861, comprising a condenser and a pair of resistors having an adjustable tap 862 for gain control, and a coupling condenser 863 to the control grid of an amplifier pentode tube 865. This grid is biased by means of a voltage divider which comprises resistors 867 and 869 connected in series between ground and the conductor 599 which is maintained at a negative voltage with respect to ground. The resistor 871 is connected between the control grid of the tube 865 and the voltage divider at a point intermediate the resistors 867 and 869. The output of the tube 865 is coupled by a condenser 873 and a grid resistor 874 to the control grid of the second section of the dual-triode amplifier tube 853. Consequently, this second section produces a plate current controlled by the reflection or echo pulse.

The fixed range markers are derived from a portion of the output of the frequency divider 81 which is applied through the coupling condenser 175 (Fig. 6), the conductor 177 and a resistor 880 to the control grid of a first section of a dual-triode amplifier tube 881 (Fig. 11). The output of the first section of the tube 881, therefore, is represented by a component of plate current having a frequency of 32.79 kilocycles per second.

The control for the movable range marker is derived from the range scope through the conductor 685. This conductor is coupled by a condenser 883 to the control grid of the second section of the tube 881. The grid resistor 885 for this section may have an adjustable tap 887 for the purpose of adjusting the signal input to the control grid.

It is desirable that the fixed and movable range markers be applied to the P. P. I. scope only at times to be selected by the operator. To this end a pair of switches 889 and 891 are provided for controlling, respectively, the fixed and movable range markers. The switch 889 is arranged normally to short circuit the input grid resistor for the first section of the tube 881 which controls the fixed range marker. The switch 891 similarly normally short circuits the input to the second section of the tube 881 which controls the movable range marker. When it is desired to provide one of the range markers on the P. P. I. scope, the appropriate switch 889 or 891 is opened.

By inspection of Fig. 11, it will be observed, that the four plates of the dual-triode tubes 853 and 881 are connected in parallel to a common plate resistor 893. The four outputs of the tubes 853 and 881 are, therefore, added and applied to the control grid of a pentode amplifier tube 895, through a coupling condenser 897. The output of the amplifier tube 895, in turn, is coupled through a condenser 899 and a resistor 900 to the control grid 767 of the P. P. I. scope 29.

The operation of the P. P. I. scope now may be reviewed briefly. An electron beam produced in the P. P. I. scope is deflected away from the center of the screen of the P. P. I. scope. The direction of such deflection corresponds to the direction of radiation from the transmitter parabola 45 of Fig. 8. The initiation of each deflection from the center of the screen coincides substantially with the time of emission of each radiated pulse from the transmitting parabola. When the pulse radiated from the transmitting parabola 45 strikes an object, it sets up a reflection or echo pulse which is received by the receiving parabola 47 of Fig. 8. During the time required for the pulse to travel from the transmitting parabola 45 to the object and for the reflection or echo pulse to return to the receiving parabola 47, the deflection of the electron beam in the P. P. I. scope has proceeded for a distance corresponding to the distance from the parabolas to the object to be located.

At the time the electron beam in the P. P. I. scope starts its deflection from the center of the screen, an unblanking pulse is derived from the tube 811, which is controlled from the synchronizer through the multivibrator 801. This unblanking pulse raises the voltage of the control grid 767 of the P. P. I. scope with respect to the cathode to a level such that the electron beam produces a barely visible trace, or a trace just below visibility, on the screen. When the reflection or echo pulse is also applied to the control grid 767, the electron beam is intensified to produce a bright dot on the screen of the P. P. I. scope. As long as the transmitting parabola is pointed directly towards the object to be located this bright dot is reproduced once for each deflection of the electron beam. However, if the transmitting parabola is continuously rotated to scan an area, the bright dot is produced on the screen of the P. P. I. scope only while an object is in the path of the rotating pulsed beam radiated from the parabola. Depending on the angular widths of the rotating beam and the object, the dot may be produced on the screen once, or a few times for each revolution of the transmitting parabola. The scanning rate of rotation is usually low enough to permit several pulses to be reflected from an object during each revolution of the beam. Since the time required for the radiated pulse from the transmitting parabola 45 to reach the object to be located and for the reflected pulse to reach the receiving parabola determines the distance of the bright dot on the screen of the P. P. I. scope from the center of the screen, this distance is a measure of the range of the object to be located from the observation station.

To assist in determining the range of the bright dot more accurately the switch 889 may be opened. This results in the application to the control grid 767 of the P. P. I. scope of a voltage pulse which repeats at a frequency of 32.79 kilocycles per second. This frequency is such that the time between successive pulses corresponds to the time required for a pulse transmitted from the transmitting parabola to travel 5000 yards plus the time required for a reflection or echo pulse to travel 5000 yards towards the receiving parabola. For this reason, the repetitive pulses applied to the control grid 767 of the P. P. I. scope by the opening of the switch 889 produce a series of bright reference dots on the screen which are spaced by distances equivalent to points located in multiples of 5000 yards from the observation station. Consequently, these dots constitute a scale from which the approximate range of an object to be located may be ascertained.

When the switch 891 is open, a reference dot is produced on the screen of the P. P. I. scope which is located at a distance from the center of the screen dependent on the phase displacement between the fixed and movable pulses produced by the synchronizer. As previously explained, when the range scope is adjusted to indicate the range of an object to be located, the fixed and movable pulses have a phase or time displacement corresponding to the distance of the object to be located from the observation station. Consequently, under these conditions, the reference dot produced on the screen of the P. P. I. scope by the opening of the switch 891 should be at the same distance from the center of the screen as the bright dot representing the object to be located. Since the reference dot indicates the phase or time displacement between the fixed and movable pulses, it is convenient to establish the approximate correct time or phase displacement by adjusting the reference dot across the screen of the P. P. I. scope until it substantially coincides with the dot representing an object to be located. A more accurate location of reference dot then may be effected by utilization of the range scope.

As previously pointed out, when the transmitting parabola is continuously rotating, the direction of deflection of the electron beam in the P. P. I. scope rotates in unison therewith. Since the fixed and movable range markers under these conditions produce a dot for each deflection of electron beam, the fixed and movable range markers appear on the screen as fixed and movable range rings. This assumes that the fluorescent screen of the P. P. I. scope is formed of long-persistence fluorescent material.

As previously explained, the switch 831 may be employed for controlling the rate of deflection of the electron beam in the P. P. I. scope. With the switch in the position illustrated in Fig. 11, the deflection of the electron beam is relatively rapid and may correspond to a maximum range distance of 10,000 yards. When the switch 831 engages its contact 839, the deflection of the electron beam is relatively slow. Consequently, the maximum range of the P. P. I. scope is increased to a longer value which may be of the order of 35,000 yards.

Since the yoke 759 may rotate continuously, it is desirable that connections to the coil 756 be completed through slip rings and brushes to permit such continuous rotation of the yoke.

*Power supply and control equipment*

The power supply for the entire system is derived from any suitable source such as that represented by the generator 901 (Fig. 12). The nature of the source may vary appreciably. For the purpose of discussion, it is assumed that the source 901 supplies alternating current at a voltage of 115 volts and a frequency of 60 cycles per second. Connection of the source 901 to the system is effected through a switch 903 which is shown in its open position. When the switch 903 is actuated to its closed position, it connects the source 901 to the conductor 319 and a conductor 905.

Because of the high voltages employed in the system, an interlock relay 907 is provided which permits energization of the system only if the various parts of the system are in their operating positions. Under such circumstances, the interlock relay 907 closes its contacts 909 to connect the conductor 905 to the conductor 321. The operation of the interlock relay will be discussed in greater detail below.

The conductors 319 and 321 supply energy through suitable filament transformers to the filaments of the various tubes in the system. As a specific example of such connections, reference may be made to Fig. 7, wherein the filament transformer 421 energizes the filaments of the rectifier tubes 413 and 415 from the conductors 319 and 321. In order to simplify the circuit diagrams, most of the remaining filament transformers and connections therefore have been omitted.

It will be recalled that certain other parts of the system are energized directly from the conductors 319 and 321. For example, in Fig. 8 the field windings of the magnetron are energized from the conductors 319 and 321 through the transformer 63g and the rectifier 63f. As a further example, the rectifier 315 in Fig. 7 is energized from the conductors 319 and 321 through the transformer 317. It will be understood that closure of the switch 903 and the relay 907 (Fig. 12) energizes all parts of the system connected to the conductors 319 and 321.

In addition, a pair of full-wave rectifier tubes 911 and 913 are energized from the conductors 319 and 321. Each of these rectifier tubes has associated therewith a filter 915 or 915' and suitable voltage-regulating equipment. The voltage regulated outputs of the two filters are employed for energizing the local oscillator 487 of Fig. 8 and for supplying bias voltages to other portions of the system.

The filtered and regulated output of the rectifier tube 911 is supplied to the two conductors 513 and 517. The filtered and regulated output of the rectifier tube 913 is supplied to the two conductors 517 and 515. It will be observed that these two outputs are connected in series for the purpose of energizing the voltage divider 499 associated with the local oscillator 487 of Fig. 8.

The positive output terminal of the filter 915 which is associated with the rectifier tube 911 is connected to the conductor 517 through a regulating tube 917 which has a resistance determined by plate current flowing in the plate circuit of a pentode tube 919. The control grid of the tube 919 is connected to a voltage divider which includes resistors 921 and 922. This voltage divider is connected across the output conductors 513 and 517. It will be observed that a voltage regulator tube 923 is located in the cathode circuit of the tube 919. Consequently, the bias applied to the control grid of the tube 919 is determined by the voltage drops across the voltage regulator tube 923 and across the resistor 921. When the voltage across the output conductors 513 and 517 increases, the control grid of the tube 919 becomes less negative with respect to its cathode. Consequently, the plate current of the tube increases and the drop across the plate resistor of the tube increases. The drop in the voltage across the plate resistor of the tube 919 determines in part the bias supplied to the control grid of the tube 917. The increase in the drop across the plate resistor of the tube 919 makes the control grid of the tube 917 more negative with respect to its cathode and results in an effective increase in the drop across the tube 917. When the circuit is properly adjusted, it maintains the output voltage across the conductors 513 and 517 substantially constant.

The output of the rectifier tube 913 passes through its filter 915' and is regulated by its associated tubes 917', 919' and 923' in substantially the same manner described with reference to the rectifier tube 911. Parts associated with the rectifier tube 913 which correspond to similar parts associated with the tube 911 have the same reference numerals applied thereto, but the reference numerals are primed. It should be observed that the bias for the control grid of the tube 919' associated with the rectifier tube 913 is derived through the conductor 511 from the voltage divided 499 (Fig. 8). This bias is adjustable by operation of one of the taps on the voltage divider for the purpose of varying the voltage between the cathode and cavity resonator of the local oscillator. From this discussion, it will be appreciated that the rectifier tubes 911 and 913 supply voltage-regulated direct-current outputs to the two sections of the voltage divider 499.

In addition, one of the output terminals of the rectifier tube 913 is connected through a dropping resistor 927 to a conductor 929 for the purpose of applying to the conductor 929 a negative voltage with respect to ground. (The conductor 515 is grounded as shown in Fig. 8.) A voltage regulator tube 931 is associated with the dropping resistor 927 for further regulating the voltage applied to the conductor 929. The conductor 929 is connected to the conductor 599 (see Figs. 10 and 11) for the purpose of providing a negative bias with respect to ground for certain of the tubes employed in the system.

The condition of the system wherein the conductors 319 and 321 are energized may be termed the "standby condition." In this condition all filaments are energized and certain low-voltage rectifiers are energized.

By actuation of a spring-biased control button 933 having normally open and normally closed sets of contacts, the system is placed in the "alert condition." In this condition, the system is fully energized except for the application of high voltage between the filament and anode of the magnetron tube. Actuation of the control button 933 to engage its lower, normally-open contacts establishes a closing circuit for a relay 935 which may be traced from the conductor 321 through a conductor 937, the lower contacts (as viewed in Fig. 12) of the control button 933, the normally-closed contacts of a spring-biased control button 939, the solenoid of the relay 935, a conductor 941, the conductor 943 and a conductor 1037 to the conductor 319. In response to such energization, the relay 935 closes to establish a holding circuit for itself which may be traced from the conductor 321, through a conductor 945, the front contacts 947 of the relay 935, the contacts of the control button 939, the closing solenoid of the relay 935 and the conductors 941, 943 and 1037 to the conductor 319. Therefore, the relay 935 closes and remains closed.

It will be observed that the normally-closed contacts of the control button 939 are in the holding circuit for the relay 935. Consequently, actuation of the control button 939 at any time to open its contacts restores the system to its "standby condition."

Closure of the relay 935 operates through the front contacts 949 of the relay to connect a conductor 951 to the conductor 321. Such connection establishes an energizing circuit for the transformer 952 of a full-wave rectifier 953. This full-wave rectifier supplies direct current through a filter 955 having one terminal grounded and the other connected to the conductor 571 and to a conductor 957. These conductors are employed for conducting plate current to tubes in portions of the system illustrated in Figs. 6, 8, 10 and 11.

After the relay 935 has closed, the system may be placed in condition for transmission by actuation of either a continuous-transmission spring-biased control button 959 or an intermittent-transmission spring-biased control button 961, each having normally-open and normally-closed sets of contacts. Actuation of the continuous-transmission control button 959 establishes a closing circuit for a relay 962 which may be traced from the conductor 319, through a conductor 963, lower contacts (as viewed in Fig. 12) of the control button 959, conductor 965, the closing solenoid of the relay 962, a conductor 967, normally-closed upper contacts of the control button 961, a conductor 971, normally-closed contacts of the protective relay 973, normally-closed upper contacts of the control button 933, a conductor 974, the contacts 947 of the relay 935 and the conductor 945 to the conductor 321. Closure of the relay 962 establishes a holding circuit for the relay for the reason that a pair of front contacts 975 of the relay are connected in parallel with the lower contacts of the control button 959. It will be observed that after a closure of the relay 962, the relay will be opened by actuation of the control button 961, the control button 933, the control button 939 or the relay 973. Such opening would interrupt continuous transmission of radiation from the system, and would place the system in the condition determined by the specific button actuated, or the condition determined by the relay.

Closure of the relay 962 completes a closing circuit for a relay 977. This closing circuit may be traced from the conductor 319, through the conductor 963, the front contacts 979 of the relay 962, the solenoid of the relay 977, the conductor 951, the front contacts 949 of the relay 935 and the conductor 945 to the conductor 321. Closure of the relay 977 energizes the primary of an adjustable auto-transformer 981 by a circuit which may be traced from the conductor 319, through a conductor 983, the primary of the auto-transformer 981, the front contacts of the relay 977, the conductor 951, the front contacts 949 of the relay 935 and the conductor 945 to the conductor 321. The secondary of the auto-transformer is connected through the conductor 425 and the conductor 319 to the primary winding of the transformer 423 (Fig. 7). The transformer 423 is associated with the high-voltage rectifier 411 which supplies high-voltage direct-current for the magnetron. Consequently, closure of the relay 977 initiates thansmission from the system.

Under some circumstances it may be desirable to provide intermittent transmission from the system. Such intermittent transmission is obtained by actuation of the intermittent-transmission control button 961. Actuation of this control button opens the holding circuit for the relay 962 and establishes a closing circuit for a relay 985. The closing circuit for the relay 985 may be traced from the conductor 319, through the conductor 963, the lower contacts of the control button 961, the closing solenoid of the relay 985, a conductor 987, the upper contacts of the contact button 959, the conductor 971, the contacts of the protective relay 973, the upper contacts of the control button 933, the conductor 974, the contacts 947 of the relay 935, and the conductor 945 to the conductor 321. Since the relay 985 has front contacts 989 connected in parallel with the lower contacts of the control button 961, closure of the relay 985 establishes a holding circuit for the relay. Closure of the relay 985 also partially establishes an energizing circuit for the relay 977 which may be traced from the conductor 319, through the conductor 963, the front contacts 991 of the relay 985, a conductor 993 the movable contact 995a of a contactor 995 (spring-biased upwardly to open position), the fixed contact 995b of the contactor, the closing solenoid of the relay 977, the conductor 951, the front contacts 949 of the relay 935 and the conductor 945 to the conductor 321. Completion of the closing circuit for the relay 977 depends on closure of the contacts of the contactor 995. Such closure is effected by a cam 997 which is rotated by means of a synchronous motor 999 suitably geared to the cam and connected in parallel with the closing solenoid of the relay 985 for energization from the conductors 319 and 321. From this discussion it follows that the motor 999 is energized to produce intermittent closure of the contacts of the contactor 995 as long as the relay 985 is in its closed condition. Such intermittent closure of the contactor 995 intermittently operates the relay 977 to apply intermittently high voltage to the magnetron. Consequently, closure of the control button 961 produces intermittent transmission from the system. As a specific example, the contactor 995 may be designed to produce transmission from the system for a period in the range between zero and 30 seconds per minute.

The protective relay 973 is maintained in its closed position by means of a latch having the tripping solenoid 431 associated therewith. As previously explained, the tripping solenoid 431 is energized in accordance with the anode current of the magnetron. When this current exceeds a predetermined safe maximum value, the protective relay 973 is tripped. Such tripping results in the disconnection of the high voltage supply for the magnetron.

In order to reset the protective relay 973 after a tripping operation thereof, a resetting, spring-biased control button 1001 is provided. Actuation of this control button to engage its contacts connects a closing coil of the relay 973 across the conductors 319 and 321.

Because of the large number of circuits employed, it is desirable that indications be provided for indicating the energization of the various circuits. For example, an indicator lamp 1003 may be connected between the conductors 319 and 321. When the switch 903 and the interlock relay 907 are closed to energize the conductors 319 and 321, the indicator lamp 1003 is illuminated to indicate such energization.

As a further example, an indicator lamp 1005 may be connected in parallel with the synchronous motor 999. When the intermittent transmission control button 959 is actuated to start the synchronous motor, the indicator lamp 1005 is illuminated to indicate that the system is in condition for intermittent transmission.

In order to localize trouble in the system, it is desirable to provide separate fuses 1007 for the various circuits. Each fuse may have an indicator glow lamp 1009 connected in series with a suitable resistor 1015 across the fuse. Should a fuse blow, the associated glow lamp 1009 is illuminated to indicate the faulty circuit.

*The housing*

The system conveniently may be divided into two separate assemblies, one of which comprises the antenna assembly. The antenna assembly includes the platform 49 illustrated in Fig. 5a, on which the transmitting and receiving parabolas are mounted. In addition, it is convenient to mount on the same platform the magnetron tube, the local oscillator, the preamplifier and the modulator. The entire antenna assembly may be protected by a housing of suitable material such as thin plywood (not shown).

The remainder of the system conveniently may be housed in a cabinet similar to that illustrated in Figs. 13 and 13a. The cabinet includes a plurality of racks or shelves 1017, 1018, 1019, 1021 and 1023, each of which is removably mounted in the cabinet 1016. Conveniently each shelf may be provided with rails 1025 and rollers 1026 which cooperate with rollers 1027 and channels 1028 on the cabinet to permit sliding withdrawal of each shelf from the cabinet in a manner well understood in the art. Each shelf additionally is provided with a terminal panel 1029 having a plurality of plug terminals 1031 which are slidably received in socket terminals 1035 mounted on an insulating member within the cabinet 1016. Electrical apparatus mounted on each of the shelves is connected to the various terminal plugs on the associated terminal insulation panel 1029. Consequently, removal of each shelf from the cabinet interrupts the connections from the terminal sockets 1035 to electrical apparatus mounted on the shelf. Reinsertion of the shelf in the cabinet reestablishes the connections between the sockets and the electrical parts. It will be understood that the sockets associated with the shelves are suitably connected to each other within the cabinet 1016.

In a specific embodiment of the invention, the shelf or rack 1017 may be designed to receive the P. P. I. scope and associated controls. The shelf 1018 may be designed to receive the range scope and associated controls. Both the synchronizer and a portion of the receiver may be mounted on the shelf 1019. The control and low-voltage supply equipment conveniently may be installed on the shelf 1021.

Because of the high voltages involved, it is desirable that removal of any of the shelves results in deenergization of the complete system. To this end, the shelves are provided with interlock switches which interrupt the closing circuit for the interlock relay 907 (Fig. 12) when any of the shelves is removed from its operative position. To illustrate the control for the interlock relay, the energizing circuit for the relay may be traced in Fig. 12 from the conductor 319, through a conductor 1037, the closing coil of the interlock relay 907, a conductor 1039 which extends to an interlock switch 1041 (Fig. 6), a conductor 1043, an interlock switch 1045 (Fig. 11), a conductor 1047, an interlock switch 1049 (Fig. 10), and a conductor 1051 to the conductor 905 in Fig. 12. If the interlock switches 1041, 1045 and 1049 are all closed, an energizing circuit for the interlock relay 907 is completed when the switch 903 is closed. Should any of the interlock switches be opened as by removal of one of the shelves from its operative position within the cabinet, the energizing circuit for the interlock relay is interrupted and the entire system is deenergized.

Each of the interlock switches is associated with a different shelf. For example, the interlock switch 1041 (Fig. 6) may be associated with the shelf 1019 (Fig. 13) on which the synchronizer and parts of the receiver are mounted. The interlock switch 1045 (Fig. 11) may be associated with the shelf 1017 which supports the P. P. I. scope, and the interlock switch 1049 may be associated with the shelf 1018 which supports the range scope.

Each of the interlock switches may be formed of two of the terminal plugs 1031 mounted on the associated shelf. These plugs are connected by suitable conductors to establish a circuit between their associated sockets when the shelf is in its operative position. When the shelf is removed from its operative position, the plugs 1031 are withdrawn from their associated sockets to open the circuit.

*Antenna rotation*

As previously pointed out, provision is made for continuously rotating the transmitting and receiving parabolas for the purpose of scanning a large area surrounding the observation station. Referring to Fig. 8, it will be noted that the platform 49 is rotated by means of the position motor 55 which is geared to the platform by the gearing 57. The position motor 55 rotates in unison with a position generator 1053 which may be mounted in the cabinet 1016 of Fig. 13. The position motor 55 and the generator 1053 are similar in construction and have three phase windings which are connected to each other by conductors 1055. The position motor and the position generator also have single-phase windings which are rotatable with respect to the three-phase windings and which are energized through the conductors 1057 from the conductors 319 and 321. Motors and generators of the position type are well known in the field of position transmitter, and are available on the market under various trade names such as "Synchrotie."

For rotating the position generator 1053, a search motor 1059 and a manually operable knob or crank 1061 are mechanically connected to the generator through differential gearing 1063. Consequently, the generator may be rotated either by the motor 1059 or by hand as desired. The motor 1059 is of a variable speed type and is connected to the conductors 319 and 321 through the conductors 1057. It will be observed that an adjustable potentiometer 1065 controls the input to the motor 1059 for adjusting the speed of rotation thereof. The range of adjustment may be such that when the motor 1059 is in operation, the rate of rotation of the platform 49 may be adjusted over a range of ½ to 20 revolutions per minute.

Referring to Fig. 11, it will be recalled that the yoke 759 of the P. P. I. scope is to be rotated in unison with the transmitting parabola. To this end the position motor 761 which is similar in construction to the position motor 55 of Fig. 8 has its single-phase winding connected to the same single-phase source of energy through the conductors 781 and 783. The three-phase windings of the position motor 761 are connected through conductors 1067 to the three-phase windings of the position generator 1053 of Fig. 8. Consequently, the position motors 55 and 761, together with the position generator 1053, all rotate in unison.

Both the position motor 55 and the position motor 761 are connected, respectively, to the platform 49 and the yoke 759 through gearing. If the ratio of the gearing is 1:1, the platform 49 and the yoke 759 always are properly positioned with respect to each other. However, it may be desirable to gear the position motors to the platform and to the yoke in a suitable ratio such as 10:1. In other words, 10 revolutions of each position motor are required to produce one revolution of the platform and of the yoke. With such gearing, each position motor may lock in step with the position generator at any of 10 positions of the associated platform or yoke. To assure a correct relationship between the platform and the yoke under these circumstances, the position motor 761 is provided with a relay 1069 which controls the connection of the position motor to the position generator. Referring to Fig. 11, it will be observed that the position motor 761 is geared through gearing 1072 to a cam 1071. This cam is so geared that it rotates at the same rate as the yoke 759. The cam has a protuberance which once in each revolution of the cam closes a normally-open contactor 1073.

In an analogous manner, the shaft 51 of the platform 49 is provided with a cam 1075 (Fig. 8) which opens a normally-closed contactor 1077 once for each revolution of the shaft. Closure of both contactors establishes a closing circuit for the relay 1069 (Fig. 11) which may be traced from the conductor 321 (Fig. 12), through the conductor 783, the closing coil of the relay 1069 (Fig. 11), the contacts of the contactor 1073, a conductor 1079, the contacts of the contactor 1077 (Fig. 8) and one of the conductors 1057 to the conductor 319.

When energized, the relay 1069 in Fig. 11 opens its back contacts to interrupt the connection of the three-phase winding of the position motor 761 to the three-phase winding of the position generator 1053 of Fig. 8. At the same time, the relay 1069 closes its front contacts, to connect two terminals of the three-phase winding of the position motor 761 through a resistor 1081 and the conductor 783 to one conductor of the 115 volt alternating-current supply. Another terminal of the three-phase delta winding of the position motor 761 is connected through the conductor 781 to another conductor of the 115 volt supply. This tends to brake or lock the rotor of the position motor 761 in place and allows the platform 49 (Fig. 8) to advance with respect thereto. This operation continues until the platform 49 is positioned accurately with respect to the yoke 759 of the P. P. I. scope. When the platform 49 and the yoke 759, are properly synchronized, the lobe of the cam 1075 (Fig. 8) is proportioned to engage its contactor slightly in advance of the engagement of the cam 1071 (Fig. 11) with its contactor, and to disengage the contactor 1077 slightly after disengagement of the contactor 1073 by the cam 1071, and the relay 1069 remains continuously deenergized to permit the yoke 759 (Fig. 11) and the platform 49 (Fig. 8) to rotate in unison. It will be recalled that when the relay 1069 is deenergized the three-phase windings of the motor 761 and generator 1053 are connected. For example, the cams 1075 and 1071 may engage their contactors respectively for 15° and 10° in each revolution thereof. Consequently, once correct angular alignment between yoke and antenna platform has been established, each closure of the contactor 1073 occurs only when the contactor 1077 is open and the relay 1069 remains in the position illustrated in Fig. 11 to maintain the position motor 761 connected to the position generator 1053. If additional position motors are desired for the operation of bearing indicators, they should be associated with the position generator 1053 and with the contactor 1077 of Fig. 8 in the same manner discussed with reference to the position motor 761 of Fig. 11.

*Operation*

The operation of the system as a whole now may be set forth. Referring to Fig. 12, the first step in placing the system in operation comprises the closure of the switch 903. If the various parts are in operative positions, the interlock relay 907 closes. This energizes the filaments of the various tubes. After a time interval sufficient for the filaments to heat, the control button 933 is actuated to close the relay 935. This closure energizes the system completely except for the high voltage supply through the transformer 981.

If it is desired to align the oscillation generators in the synchronizer, the range scope 19 of Fig. 10 may be employed as a conventional cathode-ray oscilloscope. For this purpose, the switches 609, 655 and 709 in Fig. 10 are operated away from the positions illustrated in Fig. 10.

With the switch 261 in Fig. 6 in the position illustrated, if the ratio of frequencies produced by the oscillator 79 and the divider device 81 is correct, a 6 lobed Lissajous figure should appear on the screen of the range scope 19. If the correct figure does not appear, the adjustable resistor 119 of the divider device 81 is adjusted to produce the required figure.

In order to adjust the remaining two divider devices 83 and 85, the switch 261 is operated successively to its next two positions and the procedure employed in adjusting the divider device 81 is repeated for the divider devices 83 and 85. The divider devices having been correctly aligned, the switches 609, 655 and 709 of Fig. 10 are returned to the positions therein illustrated. A trace similar to the trace between the points 21 and 23 of Fig. 3, having the vertical break or step 25 therein, now should appear on the screen of the range scope. The taps 665 and 671 controlling intensity and focus should be adjusted to provide a clear trace and the taps 657 and 723 which control the horizontal and vertical center position of the trace should be adjusted to bring the trace substantially to the position illustrated in Fig. 3.

Turning now to the P. P. I. scope (Fig. 11), the intensity control represented by the adjustable tap 791 should be operated until a radial line on the screen of the scope just disappears. The switch 889 now is opened to produce on the screen of the P. P. I. scope a series of dots which are spaced by distances on the screen corresponding to range distances of 5000 yards. If necessary, the focus and intensity controls for the P. P. I. scope may be manipulated to make the dots clear. When the range switch 831 is actuated into engagement with its contact 839, several additional dots should appear on the screen of the P. P. I. scope to indicate the longer range for which the P. P. I. scope is now set. If the platform 49 (Fig. 8) is rotated, and if the searching speed or rate of rotation of the transmitting parabola is increased to maximum by operation of the potentiometer 1065 (Fig. 8), the range dots on the screen of the P. P. I. scope should appear as a series of concentric circles. The centering control of the P. P. I. scope represented by the adjustable resistor 829 should be adjusted until the innermost ring appears as a dot at the center of the screen.

With the gain control of the P. P. I. scope represented by the adjustable tap 862 (Fig. 11) set for the maximum gain, the receiver gain represented by the adjustable tap 577 (Fig. 8) should be adjusted until a faint line appears across the screen of the P. P. I. scope. The P. P. I. scope now is suitably adjusted for operation.

Returning now to Fig. 12, the continuous transmission control button 959 should be actuated for the purpose of applying high voltage to the magnetron. The autotransformer 981 then may be adjusted to provide a direct-current high-voltage output of approximately 11½ kilovolts for charging the condenser 298 (Fig. 7). Suitable measuring instruments may be mounted on one of the shelves 1021 of the cabinet (Fig. 13) to indicate various voltages and currents in the system.

Let it be assumed that the knob 251 of Fig. 6 controlling the positions of the goniometers is adjusted until the register 27 has a reading of 00000. Because of the direct pickup by the receiving parabola of radiation from the transmitting parabola, a pulse should be received by the range scope which is similar substantially to the pulse 5 of Fig. 3. This pulse, however, may have a more rectangular shape than that received by reflection or echo. The position of the vertical break 25 in Fig. 3 should be adjusted until the vertical break is adjacent the leading edge of the pulse 5. This adjustment is effected by manipulation of the adjustable resistor 679 (Fig. 10). Receiver gain should be reduced by manipulation of the adjustable tap 577 (Fig. 8) until the pulse 5 appearing on the screen of the range scope is barely discernible. Alternatively the transmitting parabola 45 (Fig. 8) may be focused on an object situated a known distance therefrom. If the register 27 (Fig. 6) is adjusted to read this known distance, the position of the vertical break 25 (Fig. 3) may be correctly adjusted with respect to the received signal or pulse by manipulation of the resistor 679.

If the local oscillator 487 of Fig. 8 is correctly tuned, the system is completely ready for operation. The motor 1059 is adjusted to rotate the platform 49 at the desired searching rate of rotation. In order to assure that the platform 49 and the yoke 759 of the P. P. I. scope are in correct step, the platform should be permitted to rotate for a sufficient time for the operation of the cams 1071 and 1075 (Figs. 8 and 11) to bring the yoke and platform into correct step. When a reflection or echo pulse is received, this pulse appears on the screen of the P. P. I. scope 29 as a bright dot, such as the dot 37 of Fig. 4. The direction or bearing of the dot with respect to a predetermined direction, such as that represented by the zero degree marking on the scale 33, is represented by the angle θ which may be read from the scale. The distance from the observation or transmitting station to the object to be located is represented by the distance between the center point 31 and the dot 37. If it is desired to locate the range more accurately, the range marker switch 889 (Fig. 11) may be opened to apply fixed range dots or rings on the screen of the P. P. I. scope. If the platform 49 supporting the transmitting and receiving parabolas is stationary, the fixed range markers appear as dots on the screen. However, if the platform is continuously rotating and if the fluorescent material of the screen is of the long-persistence type, the fixed range markers will appear as rings 39 and 41, as illustrated in dotted lines in Fig. 4. Since the distance between the rings represents a range of 5000 yards, it appears that the dot 37 is approximately 7000 yards from the observation or transmitting station.

If a still more accurate range is required, the movable marker switch 891 (Fig. 11) may be opened. Again, if the platform supporting the transmitting and receiving parabolas is stationary, the movable marker appears as a dot on the screen of the P. P. I. scope. However, if the platform is continuously rotating, the movable marker appears as a ring similar to the ring 43 illustrated in Fig. 4. The radius of the ring 43 may be varied by manipulation of the knob 251 (Fig. 6) which controls the goniometers until the ring 43 is adjacent the dot 37. At this point, the register 27 (Fig. 3) approximately indicates the range of the object to be located.

The range may be determined still more accurately by reference to the range scope 19 (Fig. 3). To this end, the knob 251 (Fig. 6) which controls the goniometers is adjusted further until the leading edge of the pulse 5 (produced by the same reflection or echo that produces the dot 37 of Fig. 4) is adjacent the break 25. The register 27 then accurately indicates the range of the object to be located. As previously pointed out, the accuracy obtainable with a system of this type may be well within 50 yards.

It should be noted that the range scope 19 (Fig. 3) portrays a small portion of the total range. The correct portion depicted by the range scope may be readily selected by adjusting the movable ring 43 (Fig. 4) to a position passing through, or adjacent, the dot 37 which represents the object to be located.

It has been assumed that the system was adjusted for a range such as 10,000 yards maximum. If a longer range is desired, such as 35,000 yards maximum, the switch 831 (Fig. 3) may be actuated into engagement with its contact 839. The operation of the system for the longer range is similar to that above described. The principal noticeable difference is that the marker rings 39 and 41 are replaced by a larger number of marker rings corresponding to the increased range.

Let it be assumed that the platform 49 in Fig. 8 is continuously rotated for the purpose of searching the area surrounding the observation station. If an object has been noted in this area, it may be desirable to discontinue the rotation of the platform and to maintain the transmitting and receiving parabolas directed towards the object. This may be accomplished by disconnecting the searching motor 1059 and controlling the position of the platform 49 by manual operation of the knob 1061. In this manner the transmitting and receiving parabolas may be continuously fixed on the desired object. It should be understood that under these circumstances, the fixed and movable range markers appear on the screen of the P. P. I. scope as dots.

Although the invention has been described with reference to certain specific embodiments thereof, numerous modifications are possible. Therefore, the invention is to be defined only by the appended claims as interpreted in view of the prior art.

I claim as my invention:

1. In an electrical system, means for producing a plurality of alternating electrical quantities having different frequencies of alternation, and phase-shifting-means for shifting the phases of said electrical quantities at rates such that the phase relationship between said electrical quantities, before and after said phase shifting, remains undisturbed, said phase-shifting-means comprising a first phase shifter for a first one of said alternating electrical quantities, a second phase shifter for a second one of said alternating electrical quantities, and means coupling said phase shifters to a common actuating member for operation at rates corresponding to the frequencies of the respective associated electrical quantities.

2. In an electrical system, means for producing a plurality of alternating electrical quantities having different frequencies of alternation, said quantities having frequency and phase relationships selected to bring amplitude peaks of said electrical quantities substantially into alignment at a peak in each of a plurality of cycles of the electrical quantity having the lower of said frequencies of alternation, and means for shifting the phases of said alternating electrical quantities at rates such that the phase relationship of said electrical quantities to each other before and after said phase shifting remains undisturbed, said phase-shifting-means comprising a first phase shifter for a first one of said alternating electrical quantities, a second phase shifter for a second one of said alternating electrical quantities, and means coupling said phase shifters to common actuating means for operation at rates corresponding to the frequencies of the respective associated electrical quantities.

3. In an electrical system, means for producing a first alternating quantity, frequency modifying means for deriving from said first alternating quantity a second alternating quantity, one of said alternating quantities having a frequency which is a whole multiple of the other of said frequencies, a separate adjustable phase shifter for each of said electrical quantities, means coupling said phase shifters for simultaneous operation at rates such that the phase relationship between the phase-shifted alternating quantities is undisturbed, and means for segregating from said phase-shifted alternating quantities a portion having a rate of change substantially similar to the rate of change of one of said alternating quantities which occurs at the crest of each of a plurality of cycles of the other of said alternating quantities.

4. In an electrical system, means for producing an alternating electrical quantity, means for deriving from said alternating electrical quantity, an alternating electrical quantity of different frequency, said alternating electrical quantities comprising a low-frequency quantity and comprising a high-frequency quantity having a first crest in phase with each of a plurality of second crests of said low-frequency quantity, means for segregating from the quantities crests corresponding to said first crests to provide a plurality of first pulses, adjustable phase-shifting-means for shifting the phases of alternating components corresponding to said alternating electrical quantities at rates such that the phase relationship between the phase-shifted alternating quantities is undisturbed, and means for segregating from the phase-shifted alternating quantities crests corresponding to the first crests of the phase-shifted, high-frequency quantity to provide a plurality of second pulses, whereby said second pulses may be adjusted in phase relative to said first pulses.

5. In an electrical system, means for producing an alternating electrical quantity, means for deriving from said alternating electrical quantity an alternating electrical quantity of different frequency, said alternating quantities comprising a low-frequency quantity and comprising a high-frequency quantity having a first crest in phase with each of a plurality of second crests of said low-frequency quantity, means for superimposing one of said quantities on the other of said quantities to provide a resultant alternating quantity having peaks corresponding to said first crests, means for segregating from said resultant quantity said peaks to provide a plurality of first pulses, adjustable phase-shifting-means for shifting the phases of alternating components corresponding to said alternating electrical quantities at rates such that the phase relationship between the phase-shifted alternating quantities is undisturbed, means for superimposing one of said phase-shifted quantities on the other of said phase-shifted quantities to provide a resultant alternating phase-shifted quantity having peaks corresponding to said first crests of said phase-shifted high-frequency quantity, and means for segregating from the phase-shifted, resultant quantity said peaks to provide a plurality of second pulses, whereby said second pulses may be adjusted in phase relative to said first pulses.

6. In an electrical system, means for producing a plurality of alternating electrical quantities having different frequencies of alternation, means for deriving from said electrical quantities a first resultant component having a time of initiation characteristic of a first one of said electrical quantities, and having a frequency of repetition characteristic of another of said electrical quantities, adjustable means for shifting the phases of alternating components corresponding to said electrical quantities at rates such that the phase relationships between the phase-shifted alternating components are undisturbed, and means for deriving from said phase-shifted alternating components a second resultant component having a time of initiation characteristic of the phase-shifted alternating component which corresponds to said first one of said electrical quantities and having a frequency of repetition characteristic of said second one of said electrical quantities, whereby the phase of said second resultant component relative to the first resultant component may be adjusted.

7. In an electrical system, means for producing a plurality of alternating electrical quantities having different frequencies of alternation, said quantities having phase and frequency relationships selected to bring amplitude peaks of said electrical quantities substantially into alignment at a peak in each of a plurality of cycles of the electrical quantity having a lower one of said frequencies of alternation to provide first resultant peaks, means for deriving from said electrical quantities a first repetitive quantity corresponding to said resultant peaks, adjustable means for shifting the phases of alternating components corresponding to said electrical quantities at rates such that the phase relationships of said phase-shifted alternating components to each other are undisturbed, and means for deriving from the phase-shifted alternating components a second repetitive quantity corresponding to the resultant peaks of said phase-shifted alternating components, whereby the phase of said second repetitive quantity relative to said first repetitive quantity may be adjusted by operation of said adjustable means.

8. In an electrical system, means for producing a first electrical quantity having a predetermined frequency of alternation, means responsive to the frequency of alternation of said first electrical quantity for producing a second electrical quantity having a frequency of alternation differing from, and bearing a predetermined relationship to, the frequency of alternation of said first electrical quantity, said quantities having phase and frequency relationships selected to bring amplitude peaks of said electrical quantities substantially into alignment at a peak in each of a plurality of cycles of the electrical quantity having a lower one of said frequencies of alternation to provide first resultant peaks, means for deriving from said electrical quantities a first repetitive quantity corresponding to said resultant peaks, adjustable means for shifting the phases of alternating components corresponding to said electrical quantities at rates such that the phase relationships of said phase-shifted electrical components to each other are undisturbed, and means for deriving from the phase-shifted alternating components a second repetitive quantity corresponding to the resultant peaks of said phase-shifted alternating components, whereby the phase of said second repetitive quantity relative to said first repetitive quantity may be adjusted by operation of said adjustable means.

9. In an electrical system for ascertaining an unknown, means for producing a plurality of alternating electrical quantities having different frequencies of alternation, means for deriving from said electrical quantities a first resultant component having a time of initiation characteristic of a first one of said electrical quantities, and having a frequency of repetition characteristic of another of said electrical quantities, adjustable means for shifting the phases of alternating components corresponding to said electrical quantities at rates such that the phase relationships between the phase-shifted alternating components are undisturbed, means for deriving from said phase-shifted alternating components a second resultant component having a time of initiation characteristic of the phase-shifted alternating component which corresponds to said first one of said alternating components and having a frequency of repetition characteristic of the second one of said alternating components, whereby the phase of said second resultant component relative to the first resultant component may be adjusted, means responsive to said first resultant component for producing a repetitive quantity bearing a phase relationship to said first resultant component dependent on an unknown to be ascertained, and means cooperating with said adjustable means for establishing a predetermined phase relationship between said second resultant component and said repetitive quantity, whereby the phase relatioship between said first and second resultant quantities is a measure of said unknown.

10. In an electrical system for locating an unknown object with respect to a predetermined position, means for producing a first alternating electrical quantity having a first frequency of alternation, means for deriving from said first alternating electrical quantity a plurality of alternating electrical quantities, each of said alternating electrical quantities having a frequency of alternation differing from the frequencies of alternation of the others of said electrical quantities, said alternating electrical quantities having frequency and phase relationships selected to bring crests of said alternating electrical quantities into alignment at each of a plurality of basic crests of the alternating electrical quantity having the lowest frequency of alternation, means superimposing alternating components corresponding to said electrical quantities to provide a first alternating resultant having sharply defined first peaks at each of said basic crests, adjustable means for shifting the phase of each of a plurality of alternating components corresponding respectively to said alternating electrical quantities at rates such that the phase relationships between the phase-shifted alternating components are undisturbed, means super-imposing the phase-shifted alternating components to provide a second alternating resultant having sharply-defined second peaks which may be adjusted in phase relative to said first peaks by operation of said adjustable means, means responsive to said first peaks for transmitting from said predetermined position a plurality of pulses each having a known rate of travel and capable of producing a return pulse from said unknown object, means for detecting said return pulses at said predetermined position, whereby the phase displacement between one of said transmitted pulses at the beginning of its transmission and the resulting return pulse at the time of detection is a measure of the distance of said unknown object from said predetermined position, means controlled by said adjustable means for establishing a predetermined phase relationship between said return pulses and said second peaks, whereby the phase relationship between said second peaks and said first peaks is a measure of the distance between said object and said predetermined position.

11. In an electrical system for locating an unknown object with respect to a predetermined position, means for producing a first alternating electrical quantity having a first frequency of alternation, means for deriving from said first alternating electrical quantity a plurality of alternating electrical quantities, each of said alternating electrical quantities having a frequency of alternation differing from the frequencies of alternation of the others of said electrical quantities, said alternating electrical quantities having frequency and phase relationships selected to bring crests of said alternating electrical quantities into alignment at each of a plurality of basic crests of the alternating electrical quantity having the lowest frequency of alternation, means superimposing components corresponding to said electrical quantities to provide a first alternating resultant having sharply-defined first peaks at each of said basic crests, means substantially segregating said first peaks from the remainder of said first alternating resultant, adjustable means for shifting the phase of each of a plurality of alternating components corresponding to said alternating electrical quantities at rates such that the phase relationships between the phase-shifted alternating components is undisturbed, means superimposing components corresponding to the phase-shifted alternating components to provide a second alternating resultant having sharply-defined second peaks which may be adjusted in phase relative to said first peaks by operation of said adjustable means, means substantially segregating said second peaks from the remainder of said second alternating resultant, means responsive to said segregated first peaks for transmitting from said predetermined position a plurality of directional pulses each having a known rate of travel and capable of producing a return pulse from said unknown object, means for detecting said return pulses at said predetermined position, whereby the phase displacement between one of said transmitted pulses at the beginning of its transmission and the resulting return pulse at the time of detection is a measure of the distance of said unknown object from said predetermined position, and the direction of said pulses is indicative of the direction of said unknown object from said predetermined position, means controlled by said adjustable means for establishing a predetermined phase-relationship between said return pulses and said segregated second peaks, whereby the phase-relationship between said segregated second peaks and said first peaks is a measure of the distance between said object and said predetermined position, and means for indicating a value corresponding to said last-named phase relationship.

12. In an electrical system for locating a body with respect to a predetermined position, means for producing a first-basic electrical oscillating quantity of predetermined frequency, frequency modifying means controlled by said first-basic electrical oscillating quantity for producing a second-basic electrical oscillating quantity, each of said oscillating quantities having a unique frequency of alternation, means including adjustable phase-shifting-devices for deriving from said basic electrical oscillating quantities a first set containing a plurality of oscillating quantities each corresponding to, but adjustable in phase relative to, a separate one of said basic oscillating quantities, and a second set containing a plurality of oscillating quantities each corresponding to a separate one of said basic oscillating quantities, the phase relations of the oscillating quantities in each of said sets and the frequencies of the oscillating quantities being selected to bring crests of the oscillating quantities in each of said sets into alignment at each of a plurality of basic crests of the oscillating quantity having the lowest frequency of oscillation, means relating said phase-shifting-device for operation at rates such that the phase-relationships of the oscillating quantities in said first set are undisturbed relative to each other during such operation of the phase-shifting devices, means additively combining the oscillating quantities in said second set to provide a resultant oscillating quantity having a sharp second peak at each of the basic crests occurring in said second set, means additively combining the oscillating quantities in said first set to provide a resultant first peak at each of the basic crests occurring in said first set, said first peaks forming one series of peaks adjustable in phase relative to the series comprising said second peaks by operation of said phase-shifting-devices, means controlled by a first one of said series of peaks for directing a series of radiation pulses, having a known rate of travel and capable of reflection, towards the body to be located, means for detecting the reflected pulses, means for comparing the phase relationship of said reflected pulses to a second one of said series of peaks for facilitating establishment of a predetermined phase relationship therebetween by operation of said phase-adjusting devices, whereby the adjustment of said phase-adjusting-devices required to establish said predetermined phase relationship is a measure of the distance between the object to be located and said predetermined position, and means indicating the adjustment of said phase-shifting devices.

13. In an electrical system for locating a body with respect to a predetermined position, means for producing a first basic electrical oscillating quantity of predetermined frequency, frequency modifying means controlled by said first basic electrical oscillating quantity for producing a second basic electrical oscillating quantitiy, each of said oscillating quantities having a unique frequency of alternation, means including adjustable phase-shifting-devices for deriving from said basic electrical oscillating quantities a first set containing a plurality of oscillating quantities each corresponding to, but adjustable in phase relative to a separate one of said basic oscillating quantities, and a second set containing a plurality of oscillating quantities each corresponding to a separate one of said basic oscillating quantities the phase relations of the oscilating quantities in each of said sets and the frequencies of the oscillating quantities being selected to bring crests of the oscillating quantities in each of said sets into alignment at each of a plurality of basic crests of the oscillating quantity having the lowest frequency of oscillation, means relating said phase shifting devices for operation at rates such that the phase-relationships of the oscillating quantities in said first set are undisturbed relative to each other during such operation of the phase-shifting devices, means additively combining the oscillating quantities in said second set to provide a resultant oscillating quantity having a sharp second peak at each of the basic crests occurring in said second set, means additively combining the oscillating quantities in said first set to provide a resultant first peak at each of the basic crests occurring in said first set, said first peaks forming one series of peaks adjustable in phase relative to the series comprising said second peaks by operation of said phase shifting devices, means controlled by a first one of said series of peaks for directing a series of radiation pulses, having a known rate of travel and capable of reflection, towards the body to be located, means for detecting the reflected pulses, means for comparing the phase-relationship of said reflected pulses with a second one of said series of peaks for facilitating establishment of a predetermined phase-relationship therebetween by operation of said phase-adjusting-devices, whereby the adjustment of said phase-adjusting-devices required to establish said predetermined phase-relationship is a measure of the distance between the object to be located and said predetermined position, and means indicating the adjustment of said phase-shifting-devices, said comparing means comprising a cathode-ray tube having a fluorescent screen, means for producing an electron beam in said tube, first control means controlled by said reflected pulses, second control means responsive to said last-named series of peaks for controlling said electron beam, one of said control means comprising means for initiating a displacement of said electron beam having a first discontinuity therein across said screen, and the other of said control means comprising means for providing a second discontinuity in the trace of said electron beam, whereby said adjustable phase-shifting-devices may be operated to bring said discontinuities to a predetermined relationship.

14. In an electrical system for ascertaining an unknown, means for producing a plurality of alternating electrical quantities each having a unique frequency of alternation, said electrical quantities being selected to permit crests of said electrical quantities to be brought into alignment at each of a plurality of crests of the electrical quantity having the lowest frequency of alternation, means for deriving from said electrical quantities two sets of alternating components, each of said components in each of said sets corresponding to a separate one of said electrical quantities, said last-named means including adjustable phase-shifting-means for shifting the phase-relationships of the components in one of said sets relative to said electrical quantities at rates such that the phase-relationships between the components in said one set are undisturbed, means for producing a repetitive quantity bearing a phase-relationship relative to a resultant function of a first one of said sets of alternating components which is a measure of the unknown to be determined, means for comparing the phase-relationship of said repetitive quantity with a resultant function of a second one of sets of components, whereby said phase-adjusting-means may be adjusted to establish a predetermined phase-relationship between said last-named resultant function and said repetitive quantity, and means for indicating the adjustment of said phase-adjusting-means, whereby said indicating means indicates a measure of said unknown.

15. In an electrical system for ascertaining an unknown, means for producing a plurality of alternating electrical quantities each having a unique frequency of alternation, said electrical quantities being selected to permit crests of said electrical quantities to be brought into alignment at each of a plurality of crests of the electrical quantity having the lowest frequency of alternation, means for deriving from said electrical quantities two sets of alternating components, each of said components in each of said sets corresponding to a separate one of said electrical quantities, said last-named means including adjustable phase-shifting-means for shifting the phase-relationships of the components in one of said sets relative to said electrical quantities at rates such that the phase-relationships between the components in said one set are undisturbed, means for producing a repetitive function bearing a phase-relationship relative to a resultant function of a first one of said sets of alternating components which is a measure of the unknown to be determined, means for comparing the phase-relationship of said repetitive function with a resultant function of a second one of said sets of components, whereby said phase-adjusting-means may be adjusted to establish a predetermined phase-relationship between said last-named resultant function and said repetitive function, and means for indicating the adjustment of said phase-adjusting-means, whereby said indicating means indicates a measure of said unknown, said comparing means comprising a cathode-ray tube having a fluorescent screen, means producing an electron beam impinging on said screen, means responsive to a first one of said functions for initiating a displacement of said electron beam across said screen, whereby the position of said electron beam, when present, on said screen is dependent on said first one of said functions, and means responsive to a second one of said functions for introducing a discontinuity in said electron beam.

16. In an electrical system for ascertaining an unknown, means for producing a plurality of alternating electrical quantities each having a unique frequency of alternation, said electrical quantities being selected to permit crests of said electrical quantities to be brought into alignment at each of a plurality of crests of the electrical quantity having the lowest frequency of alternation, means for deriving from said electrical quantities two sets of alternating components, each of said components in each of said sets corresponding to a separate one of said electrical quantities, said last-named means including adjustable phase-shifting-means for shifting the phase-relationships of the components in one of said sets relative to said alternating quantities at rates such that the phase-relationships between the components in said one set are undisturbed, means for producing a repetitive quantity bearing a phase-relationship relative to a resultant function of a first one of said sets of alternating components which is a measure of the unknown to be determined, means for comparing the phase-relationship of said repetitive quantity with a resultant function of a second one of said sets of components, whereby said phase-adjusting-means may be adjusted to establish a predetermined phase-relationship between said last-named resultant function and said repetitive quantity, and means for indicating the adjustment of said phase-adjusting-means, whereby said indicating means indicates a measure of said unknown, said comparing means comprising a cathode-ray tube having an electron beam directed towards an indicating surface, means for initiating a first discontinuity in the trace of said electron beam on said surface controlled by said repetitive quantity, and means for initiating a second discontinuity in the trace of said electron beam controlled by said last-named resultant function.

17. In an electrical system for ascertaining an unknown, means for producing a plurality of alternating electrical quantities, each having a unique frequency of alternation, said electrical quantities being selected to permit crests of said electrical quantities to be brought into alignment at each of a plurality of crests of the electrical quantity having the lowest frequency of alternation, means for deriving from said electrical quantities two sets of alternating components, each of said components in each of said sets corresponding to a separate one of said electrical quantities, said last-named means including adjustable phase-shifting-means for shifting the phase-relationships of the components in one of said sets relative to said alternating quantities at rates such that the phase-relationships between the components in said one set are undisturbed, means for producing a repetitive quantity bearing a phase-relationship relative to a resultant function of a first one of said sets of alternating components which is a measure of the unknown to be determined, means for comparing the phase-relationship of said repetitive quantity with a resultant function of a second one of said sets of components, whereby said phase-adjusting-means may be adjusted to establish a predetermined phase-relationship between said last-named resultant function and said repetitive quantity, means for indicating the adjustment of said phase-adjusting-means, whereby said indicating means indicates a measure of said unknown, said comparing means comprising a cathode-ray tube having an electron beam directed towards an indicating surface, means for initiating a first discontinuity in the trace of said electron beam on said surface controlled by said repetitive quantity, means for initiating a second discontinuity in the trace of said electron beam controlled by said last-named resultant function, and switching means operable for connecting said cathode-ray tube to said means for producing alternating quantities to facilitate comparison of the frequencies of said alternating quantities, said switching means being effective for connecting said cathode-ray tube to deflect said electron beam along a first direction in accordance with a first one of said alternating quantities, and to deflect said electron beam along a second direction in accordance with a second one of said alternating quantities.

18. In an electrical system for ascertaining an unknown, means for producing a plurality of alternating electrical quantities each having a unique frequency of alternation, said electrical quantities being selected to permit crests of said electrical quantities to be brought into alignment at each of a plurality of crests of the electrical quantity having the lowest frequency of alternation, means for deriving from said electrical quantities two sets of alternating components, each of said components in each of said sets corresponding to a separate one of said electrical quantities, said last-named means including adjustable phase-shifting-means for shifting the phase-relationships of the components in one of said sets relative to said alternating quantities at rates such that the phase-relationships between the components in said one set are undisturbed, means for producing a repetitive quantity bearing a phase-relationship relative to a resultant function of a first one of said sets of alternating components which is a measure of the unknown to be determined, means for comparing the phase-relationship of said repetitive quantity with a resultant function of a second one of said sets of components, whereby said phase-adjusting-means may be adjusted to establish a predetermined phase-relationship between said last-named resultant function and said repetitive quantity, means for indicating the adjustment of said phase-adjusting-means, whereby said indicating means indicates a measure of said unknown, and switching means for connecting said comparing means for energization in accordance with a pair of said alternating quantities to compare the frequencies of alternation thereof.

19. In an electrical system, an electrical oscillation generator capable of generating a basic alternating quantity, frequency-dividing-means energized by said basic alternating quantity for producing a plurality of auxiliary electrical alternating quantities each having a unique frequency controlled by the frequency of said basic alternating quantity, said alternating quantities having frequencies selected to permit alignment of a peak of each of said alternating quantities at each of a plurality of basic crests of the alternating quantity having the lowest frequency, means for deriving from each of said alternating quantities two alternating components having the same frequency, means for adding a first one of the alternating components of each of said alternating quantities with their peaks in alignment at each of the basic crests of the alternating component having the lowest frequency to provide a resultant quantity having a sharp first peak at each of said last-named basic crests, means for segregating said last-named peaks from the remainder of said resultant quantity to form a set of peaks, a plurality of adjustable phase-shifter-devices, means for energizing each of said phase-shifter-devices in accordance with a separate second one of said alternating components, whereby said phase-shifter-devices have alternating outputs similar in frequency but adjustable in phase with respect to the respective second ones of said alternating components, means relating said phase-shifter-devices for adjustment at rates such that the phase-relationships between the alternating outputs thereof are independent of the adjustments thereof, said alternating outputs having peaks aligned at each of a plurality of basic crests of the alternating output having the lowest frequency, means for adding said alternating outputs to provide a resultant quantity having a sharp second peak at each of the basic crests of the lowest frequency alternating output, means for segregating said second peaks from said last-named resultant quantity to form a set of peaks, means controlled by a first one of said sets of peaks for transmitting away from a predetermined station repetitive pulses of electromagnetic radiation capable of reflection from an object intercepting such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, means for comparing the reflected pulses detected at said station with a second one of said sets of peaks, whereby said phase-shifter-devices may be adjusted to establish a predetermined relationship between said detected pulses and the second one of said sets of peaks, and means for indicating the adjustment of said phase-shifter-devices, whereby such adjustment is a measure of the distance between an object reflecting the pulses which are detected and the station.

20. In an electrical system, an electrical oscillation generator capable of generating a basic alternating quantity, frequency-dividing-means energized by said basic alternating quantity for producing a plurality of auxiliary electrical alternating quantities each having a unique frequency controlled by the frequency of said basic alternating quantity, said alternating quantities having frequencies selected to permit alignment of a peak of each of said alternating quantities at each of a plurality of basic crests of the alternating quantity having the lowest frequency, means for deriving from each of said alternating quantities two alternating components having the same frequency, means for adding a first one of the components of each of said alternating quantities with their peaks in alignment at each of the basic crests of the alternating component having the lowest frequency to provide a resultant quantity having a sharp first peak at each of said last-named basic crests, means for segregating said last-named peaks from the remainder of said resultant quantity to form a set of peaks, a plurality of adjustable phase-shifter-devices, means for energizing each of said phase-shifter-devices in accordance with a separate second one of said alternating components, whereby said phase-shifter-devices have alternating outputs similar in frequency but adjustable in phase with respect to the respective second ones of said alternating components, means relating said phase-shifter-devices for adjustment at rates such that the phase-relationships between the alternating outputs thereof are independent of the adjustments thereof, said alternating outputs having peaks aligned at each of a plurality of basic crests of the alternating output having the lowest frequency, means for adding said alternating outputs to provide a resultant quantity having a sharp second peak at each of the basic crests of the lowest frequency alternating output, means for segregating said second peaks from said last-named resultant quantity to form a set of peaks, means controlled by a first one of said sets of peaks for transmitting away from a predetermined station repetitive pulses of electromagnetic radiation capable of reflection from an object intercepting such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, means for comparing the reflected pulses detected at said station with a second one of said sets of peaks, whereby said phase-shifter-devices may be adjusted to establish a predetermined relationship between said detected pulses and the second one of said sets of peaks, and means for indicating the adjustment of said phase-shifter-devices, whereby such adjustment is a measure of the distance between an object reflecting the pulses which are detected and the station, said comparing means comprising a cathode-ray tube having a screen, said tube having means effective when energized for directing an electron beam against said screen for forming a trace thereon, means responsive to said detected pulses for producing a first predetermined configuration of said trace, and means responsive to the second one of said sets of peaks for producing a second predetermined configuration of said trace, whereby adjustment of said phase-shifter-devices can establish a predetermined relationship between said configurations.

21. In an electrical system, an electrical oscillation generator capable of generating a basic alternating quantity, frequency-dividing-means energized by said basic alternating quantity for producing a plurality of auxiliary electrical alternating quantities each having a unique frequency controlled by the frequency of said basic alternating quantity, said alternating quantities having frequencies selected to permit alignment of a peak of each of said alternating quantities at each of a plurality of basic crests of the alternating quantity having the lowest frequency, means for deriving from each of said alternating quantities two alternating components having the same frequency, means for adding a first one of the components of each of said alternating quantities with their peaks in alignment at each of the basic crests of the alternating component having the lowest frequency to provide a resultant quantity having a sharp first peak at each of said last-named basic crests, means for segregating said last-named peaks from the remainder of said resultant quantity to form a set of peaks, a plurality of adjustable phase-shifter-devices, means for energizing each of said phase-shifter-devices in accordance with a separate second one of said alternating components, whereby said phase-shifter-devices have alternating outputs similar in frequency but adjustable in phase with respect to the respective second ones of said alternating components, means relating said phase-shifter-devices for adjustment at rates such that the phase-relationships between the alternating outputs thereof are independent of the adjustments thereof, said alternating outputs having peaks aligned at each of a plurality of basic crests of the alternating output having the lowest frequency, means for adding said alternating outputs to provide a resultant quantity having a sharp second peak at each of the basic crests of the lowest frequency alternating output, means for segregating said second peaks from said last-named resultant quantity to form a set of peaks, means controlled by a first one of said sets of peaks for transmitting away from a predetermined station repetitive pulses of electromagnetic radiation capable of reflection from an object intercepting such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, means for comparing the reflected pulses detected at said station with a second one of said sets of peaks, whereby said phase-shifter-devices may be adjusted to establish a predetermined relationship between said detected pulses and the second one of said sets of peaks, and means for indicating the adjustment of said phase-shifter-devices, whereby such adjustment is a measure of the distance between an object reflecting the pulses which are detected and the station, said comparing means comprising a first cathode-ray tube having a screen, said tube having means effective when energized for directing an electron beam against said screen to form a trace thereon, means responsive to said first one of said sets of peaks for producing a first configuration of said electron beam, means responsive to said detected pulses for actuating said electron beam to produce a predetermined configuration of said trace, whereby the relationship of said configurations as determined from said trace is a measure of the distance from an object in the path of said transmitted pulses to said station, and means responsive to the second one of said sets of peaks for producing an additional configuration of said trace, whereby adjustment of said phase-shifter-devices can establish a predetermined relationship between said second and third configurations.

22. In an electrical system, an electrical oscillation generator capable of generating a basic alternating quantity, frequency-dividing-means energized by said basic alternating quantity for producing a plurality of auxiliary electrical alternating quantities each having a unique frequency controlled by the frequency of said basic alternating quantity, said alternating quantities having frequencies selected to permit alignment of a peak of each of said alternating quantities at each of a plurality of basic crests of the alternating quantity having the lowest frequency, means for deriving from each of said alternating quantities two alternating components having the same frequency, means for adding a first one of the components of each of said alternating quantities with their peaks in alignment at each of the basic crests of the alternating component having the lowest frequency to provide a resultant quantity having a sharp first peak at each of said last-named basic crests, means for segregating said last-named peaks from the remainder of said resultant quantity to form a set of peaks, a plurality of adjustable phase-shifter-devices, means for energizing each of said phase-shifter-devices in accordance with a separate second one of said alternating components, whereby said phase-shifter-devices have alternating outputs similar in frequency but adjustable in phase with respect to the respective second ones of said alternating components, means relating said phase-shifter-devices for adjustment at rates such that the phase-relationships between the alternating outputs thereof are independent of the adjustments thereof, said alternating outputs having peaks aligned at each of a plurality of basic crests of the alternating output having the lowest frequency, means for adding said alternating outputs to provide a resultant quantity having a sharp second peak at each of the basic crests of the lowest frequency alternating output, means for segregating said second peaks from said last-named resultant quantity to form a set of peaks, means controlled by a first one of said sets of peaks for transmitting away from a predetermined station repetitive pulses of electromagnetic radiation capable of reflection from an object intercepting such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, means for comparing the reflected pulses detected at said station with a second one of said sets of peaks, whereby said phase-shifter-devices may be adjusted to establish a predetermined relationship between said pulses detected at said station with a second one of said sets of peaks, whereby said phase-shifter-devices may be adjusted to establish a predetermined relationship between said detected pulses and the second one of said sets of peaks, and means for indicating the adjustment of said phase-shifter-devices, whereby such adjustment is a measure of the distance between an object reflecting the pulses which are detected and the station, said comparing means comprising a first cathode-ray tube having a screen, said tube having means effective when energized for directing an electron beam against said screen to form a trace thereon, means reponsive to said first one of said sets of peaks for producing a first configuration of said electron beam, means responsive to said detected pulses for actuating said electron beam to produce a predetermined configuration of said trace, whereby the relationship of said configurations as determined from said trace is a measure of the distance from an object in the path of said transmitted pulses to said station, means responsive to the second one of said sets of peaks for producing an additional configuration of said trace, whereby adjustment of said phase-shifter-devices can establish a predetermined relationship between said second and third configurations, a second cathode-ray tube having a screen and having means effective when energized for directing an electron beam against said screen to form a trace thereon, means responsive to said detected pulses which are detected within a fraction only of the maximum value of said difference in time which the system is designed to measure for producing a first predetermined configuration of said last-named trace, the portion of said maximum value which said fraction portrays being dependent on the adjustment of said phase-shifting-devices, and means responsive to the second one of said sets of peaks for producing a second predetermined configuration of said last-named trace, whereby adjustment of said phase-shifter-devices can establish a predetermined relationship between said last-named pair of configurations.

23. In an electrical system, an electrical electronic oscillation generator capable of generating a basic alternating quantity, frequency-dividing-means energized in accordance with said basic alternating quantity for producing a plurality of auxiliary alternating quantities each having a unique frequency controlled by the frequency of said basic alternating quantity, said basic and auxiliary alternating quantities having similar wave forms and having frequencies selected to permit alignment of a peak of each of said alternating quantities at each of a plurality of basic crests of the alternating quantity having the lowest frequency, means for adding said alternating quantities with their peaks in alignment at each of said basic crests to provide a resultant quantity having a sharp peak at each of said basic crests, means for segregating said last-named peaks from the remainder of said resultant quantity, means controlled by said last-named peaks for transmitting away from a predetermined station repetitive pulses of electromagnetic radiation capable of reflection from an object receiving such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, and measuring means responsive to the time of intervals initiated by said last-named peaks and terminated by succeeding pulses detected at said station, whereby said measuring means measures a quantity corresponding to the distance from a station of an object reflecting pulses which are transmitted from the stations.

24. In an electrical system, an electrical oscillation generator capable of generating a basic stable alternating quantity, frequency-dividing-means energized in accordance with said basic alternating quantity for producing a plurality of auxiliary alternating quantities each having an instantaneous magnitude which varies substantially continuously with respect to time and each having a unique frequency controlled by the frequency of said basic alternating quantity, said alternating quantities having substantially similar wave forms and having frequencies selected to permit alignment of a peak of each of said alternating quantities at each of a plurality of basic crests of the alternating quantity having the lowest frequency, means for adding said alternating quantities with their peaks in alignment at each of said basic crests to provide a resultant alternating quantity having a sharp peak at each of said basic crests, means for segregating said last-named peaks from the remainder of said resultant quantity, means controlled by said last-named peaks for transmitting away from a predetermined station repetitive pulses of electro-magnetic radiation capable of reflection from an object receiving such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, and measuring means responsive to the time of intervals initiated by said last-named peaks and terminated by succeeding pulses detected at said station, whereby said measuring means measures a quantity corresponding to the distance from a station of an object reflecting pulses which are transmitted from the station, said measuring means including means responsive to one of said alternating quantities for establishing a predetermined scale from which the value of the quantity being measured may be ascertained, said alternating quantities being sine waves.

25. In an electrical system, an electrical oscillation generator capable of generating a basic alternating quantity, frequency-dividing means energized in accordance with said basic alternating quantity for producing a plurality of auxiliary alternating quantities each having a unique frequency controlled by the frequency of said basic alternating quantity, said alternating quantities having similar wave forms having frequencies selected to permit alignment of a peak of each of said alternating quantities at each of a plurality of basic crests of the alternating quantity having the lowest frequency, means for adding said alternating quantities with their peaks in alignment at each of said basic crests to provide a resultant quantity having a sharp peak at each of said basic crests, means for segregating said last-named peaks from the remainder of said resultant quantity, means controlled by said last-named peaks for transmitting away from a predetermined station repetitive pulses of electromagnetic radiation capable of reflection from an object receiving such pulses, means for detecting arrival at said station of pulses reflected from an object in the path of said transmitted pulses, whereby the difference in time between initiation of one of said transmitted pulses and detection of the resulting pulse reflected from an object in the path of the transmitted pulse is a measure of the distance between the object and the station, and measuring means responsive to the time of intervals initiated by said last-named peaks and terminated by succeeding pulses detected at said station, whereby said measuring means measures a quantity corresponding to the distance from a station of an object reflecting pulses which are transmitted from the stations, said measuring means comprising a cathode-ray tube having a screen and having means effective when energized for directing an electron beam against said screen to form a trace thereon, means for deflecting said electron beam across said screen at a predetermined rate, means responsive to said last-named peaks for initiating each deflection of said electron beam, means responsive to each of said detected pulses for sensibly affecting said trace, whereby the point at which said trace is affected corresponds to the distance between a station and an object reflecting a pulse transmitted from the station, and means responsive to one of said electrical quantities for sensibly affecting said trace at successive points during deflection of said electron beam to provide a reference scale on said screen.

26. The method for producing accurately timed pulses, which comprises generating an alternating quantity of predetermined stable frequency, dividing at least part of said alternating quantity into a plurality of auxiliary alternating quantities of similar wave form each of which has a separate frequency and a phase-relationship relative to the remainder of said quantities selected to bring peaks of said alternating quantities into alignment at each of a plurality of basic crests of the alternating quantity having the lowest frequency, and adding said alternating quantities to provide a resultant quantity having sharp peaks at said basic crests.

27. The method for producing accurately timed pulses, which comprises generating an alternating quantity of predetermined stable frequency, dividing at least part of said alternating quantity into a plurality of auxiliary alternating quantities of similar wave form each of which has a separate frequency and a phase-relationship relative to the remainder of said quantities selected to bring peaks of said alternating quantities into alignment at each of a plurality of basic crests of the alternating quantity having the lowest frequency, each of the alternating quantities having an instantaneous magnitude which varies substantially continually with respect to time, adding said alternating quantities to provide a resultant quantity having sharp peaks at said basic crests, and segregating said peaks from the remainder of said resultant quantity.

28. The method for measuring the distance between a station and an object capable of reflecting electromagnetic radiation, which comprises generating an alternating quantity of predetermined frequency, dividing at least part of said alternating quantity into a plurality of auxiliary electrical quantities each of which has a separate frequency, the frequencies and phase-relationships being selected to bring peaks of said alternating quantities into alignment at each of a plurality of basic crests of the alternating component having the lowest frequency, dividing each of said electrical quantities into two alternating components, adding a first one of the alternating components of each of said alternating quantities to provide a resultant quantity having sharp repetitive first peaks, adding a second one of the alternating components of each of said alternating quantities to provide a resultant quantity having sharp repetitive second peaks, transmitting a pulse of electromagnetic radiation from a station for each of said first peaks, detecting pulses reflected from an object in the path of said radiation, phase shifting the second ones of the alternating components with respect to the first ones of said alternating components at rates such that the phase-relationships between the phase-shifted components are undisturbed until said second peaks bear a predetermined phase-relationship relative to said detected pulses, whereby the extent of said phase shifting is a measure of the distance between the object and the station.

29. In an electrical system for ascertaining an unknown, means for producing a series of first pulses having substantial spacing in time therebetween, said first pulses having a phase relationship relative to a standard which is indicative of an unknown to be ascertained, means for producing a series of second pulses having a spacing in time therebetween substantially equal to that of said first pulses, and means for ascertainably adjusting the phase of said second pulses relative to said standard, said last-named means being operable to bring said second pulses into a predetermined phase relationship relative to said first pulses, whereby the phase relationship of said second pulses relative to said standard is a measure of said unknown, said last-named means comprising means responsive to said second pulses for repeatedly tracing on a surface a straight line, means for displacing a portion at one end of said line relative to the remainder of the line to produce a stepped formation of the line, and means responsive to the first pulses for introducing a discontinuity in the line, whereby the second pulses may be adjusted in phase to bring said step in the line into a predetermined position relative to the discontinuity.

30. In an electrical system for ascertaining an unknown, means for producing a series of first pulses having substantial spacing in time therebetween, said first pulses having a phase relationship relative to a standard which is indicative of an unknown to be ascertained, means for producing a series of second pulses having a spacing in time therebetween substantially equal to that of said first pulses, and means for ascertainably adjusting the phase of said second pulses relative to said standard, said last-named means being operable to bring said second pulses into a predetermined phase relationship relative to said first pulses, whereby the phase relationship of said second pulses relative to said standard is a measure of said unknown, said last-named means comprising a cathode ray tube including means for generating an electron beam, translating means for converting the electron beam into a visible display, means responsive to the second pulse for repeatedly tracing with said electron beam a substantially straight base trace, means biasing the beam in a direction transverse to the base trace for a portion at one end of the base trace to provide a resultant trace of stepped configuration, and means responsive to the first pulses for repeatedly introducing a discontinuity in the resultant trace, whereby by said ascertainable adjustment the second pulses may be adjusted in phase to bring the step of said stepped configuration trace into a predetermined position relative to the discontinuity.

31. In electronic timing apparatus for measuring periodic intervals, means for generating a plurality of superimposed sine waves, a bias circuit connected thereto for synthesizing a timing signal from said plurality of separate sine wave frequencies, phase shifter means connected to said generating means to delay said timing signal proportionally to said interval, including means to separately shift the phases of said frequencies to thereby measure said interval.

32. Apparatus for measuring periodic intervals comprising means to generate at least three superimposed waves of different frequency, bias circuit means to obtain a timing signal from said waves, means to separately phase-shift said waves to thereby shift said timing signal a measured amount equal to said periodic interval, and indicating means geared to said phase shifting means to thereby indicate said definite periodic interval.

33. Phase shifting apparatus to produce and measure phase shifts greater than 360°, comprising a plurality of separate frequency sine wave generators having a definite frequency relationship, a plurality of phase shifters each connected to one of said separate frequency generators, mechanical gear means connecting said phase shifters together proportionally to said frequencies and adapted to be rotated to thereby shift the phases of said separate frequencies; means connecting the outputs of said phase shifters together to superimpose said separate waves, peak voltage responsive means to obtain a timing signal from said separate frequencies, and means to adjustably delay said timing signal by rotating said phase shifters; means to measure said phase shift delay relative to the phase of the highest of said separate frequencies comprising an indicator counter geared to said phase shifters and responsive to the rotation of said high frequency phase shifter for that portion of the phase shift less than 360° of said high frequency and to the rotation of said lower frequency phase shifters for that portion of the phase shift equal to whole cycle at said high frequency.

34. In electronic timing apparatus, means for measuring periodic intervals comprising an oscillator for generating a substantially constant reference frequency, means connected to said oscillator for producing a plurality of superimposed sine wave frequencies having definite phase relationships to said reference frequency, bias circuit means connected for obtaining a timing signal at said periodic frequency from said separate frequencies, and means to delay said timing signal proportionally to said interval including phase shifters connected to separately shift the phase of said separate frequencies.

35. In an electronic timing apparatus, means for measuring periodic intervals comprising an oscillator for generating a substantially constant reference sine wave frequency, a chain of frequency dividers connected to said oscillator for producing a plurality of separate superimposed sine waves having definite frequency and phase relationships to said reference frequency, bias circuit means for obtaining a pulse at said periodic frequency from said separate sine wave frequencies, means connected to each of said frequency dividers for shifting the phases of said separate frequencies and means to connect the outputs of said phase shifters to thereby delay said pulse a definite measurable time.

36. In electronic timing apparatus, means for generating a substantially constant frequency, means for generating at least three separate frequencies having definite phase relationships to said constant frequency, a plurality of phase shifters each connected to one of said separate frequency generators, said phase shifters being mechanically geared together proportionally to said frequencies and adapted to be rotated to thereby shift the phases of said separate frequencies, means connecting the outputs of said phase shifters for superimposing said separate frequencies, selector circuit means connected to said last means to thereby obtain a timing pulse, and means to delay said pulse a definite measurable time by rotation of said phase shifters.

37. Electronic timing apparatus for measuring periodic intervals between received radio signals comprising a radio receiver, cathode ray indicating means connected to said receiver to indicate said received periodic signals, means to measure the interval between said received signals comprising means to generate a plurality of separate sine wave frequency means connecting the outputs of said phase shifters to superimpose said frequencies waves, peak voltage responsive means to produce a timing signal from said sine wave frequencies on said cathode ray indicating means at said periodic frequency, means to match said timing signal to said received signals on said cathode ray tube by phase shifting said separate frequencies to thereby delay said timing signal a definite time, and means connected to said phase shifters to automatically indicate the interval between said received signals.

38. Timing apparatus comprising an oscillator, a plurality of frequency dividers connected in series with each other and with said oscillator, a plurality of phase shifters each having their inputs connected to a different one of said frequency dividers, means to connect the outputs of said phase shifters to thereby superimpose the sine waves from said phase shifters, and peak responsive bias circuit means connected in series with said phase shifters and adapted to select a timing signal therefrom.

39. Timing apparatus comprising an oscillator, a plurality of frequency dividers connected in series with each other and with said oscillator, a plurality of phase shifters having the input of each connected to one of said frequency dividers, means to connect the outputs of said phase shifters to thereby superimpose their output waves, peak responsive bias circuit means connected in series with said phase shifters and adapted to select a timing signal therefrom, means to gear said phase shifters together proportionally to their associated frequencies, and counter indicator means connected to said gear means to indicate the amount of said phase shift.

References Cited in the file of this patent

UNITED STATES PATENTS

| | | |
|---|---|---|
| 1,484,967 | Schelleng | Feb. 26, 1924 |
| 1,939,434 | Busse | Dec. 12, 1933 |
| 2,105,870 | Vance | Jan. 18, 1938 |
| 2,113,214 | Luck | Apr. 5, 1938 |
| 2,121,359 | Luck et al. | June 21, 1938 |
| 2,141,281 | Southworth | Dec. 27, 1938 |
| 2,178,074 | Jakel | Oct. 31, 1939 |
| 2,181,568 | Kotowski et al. | Nov. 28, 1939 |
| 2,206,896 | Higgins | July 9, 1940 |
| 2,212,967 | White | Aug. 27, 1940 |
| 2,227,598 | Lyman et al. | Jan. 7, 1941 |
| 2,231,929 | Lyman | Feb. 18, 1941 |
| 2,241,809 | De Forest | May 13, 1941 |
| 2,262,838 | Doloraine | Nov. 18, 1941 |
| 2,266,401 | Reeves | Dec. 16, 1941 |
| 2,286,894 | Browne | June 16, 1942 |
| 2,333,322 | Levy | Nov. 2, 1943 |
| 2,338,395 | Bartelink | Jan. 4, 1944 |
| 2,345,933 | Green et al. | Apr. 4, 1944 |
| 2,403,624 | Wolff | July 9, 1946 |
| 2,403,626 | Wolff | July 9, 1946 |
| 2,405,070 | Tonks | July 30, 1946 |
| 2,405,231 | Newhouse | Aug. 6, 1946 |
| 2,405,238 | Seeley | Aug. 6, 1946 |
| 2,405,239 | Seeley | Aug. 6, 1946 |
| 2,407,898 | Norgaard | Sept. 17, 1946 |
| 2,416,088 | Deerhake | Feb. 18, 1947 |
| 2,419,205 | Feldman | Apr. 22, 1947 |
| 2,496,998 | Hershberger | Feb. 7, 1950 |
| 2,621,238 | Palmer | Dec. 9, 1952 |

FOREIGN PATENTS

| | | |
|---|---|---|
| 113,233 | Australia | June 2, 1941 |
| 552,072 | Great Britain | Mar. 22, 1943 |